United States Patent

Sato et al.

[11] Patent Number: 6,126,797
[45] Date of Patent: Oct. 3, 2000

[54] WATER PURIFYING APPARATUS CAPABLE OF EFFECTIVELY AND RELIABLY PRODUCING PURIFIED WATER WITH A SMALL CHLORINE GENERATOR

[75] Inventors: Motoharu Sato, Honjo; Kazushige Watanabe, Maebashi, both of Japan

[73] Assignee: Sanden Corporation, Japan

[21] Appl. No.: 09/168,170

[22] Filed: Oct. 8, 1998

[30] Foreign Application Priority Data

| Oct. 9, 1997 | [JP] | Japan | 9-277333 |
| Oct. 16, 1997 | [JP] | Japan | 9-283597 |
| Nov. 5, 1997 | [JP] | Japan | 9-302990 |
| Nov. 26, 1997 | [JP] | Japan | 9-324761 |

[51] Int. Cl.⁷ .................................................. C25B 9/06
[52] U.S. Cl. .................. 204/272; 204/228.1; 204/228.3; 204/228.6; 204/229.2; 204/229.6; 204/230.2
[58] Field of Search .................... 204/272, 230.2, 204/228.1, 228.3, 228.6, 229.6, 229.2

[56] References Cited

U.S. PATENT DOCUMENTS

| 736,868 | 8/1903 | McCarty | 204/228 |
| 4,293,400 | 10/1981 | Liggett | 204/302 |
| 4,776,931 | 10/1988 | Hardy | 204/105 R |
| 4,804,452 | 2/1989 | Rhodes | 204/238 |
| 5,062,940 | 11/1991 | Davies | 204/228 |
| 5,221,451 | 6/1993 | Seneff et al. | 204/229 |
| 5,306,409 | 4/1994 | Arai | 204/228 |
| 5,336,605 | 8/1994 | Wang | 204/228 |

Primary Examiner—Kathryn Gorgos
Assistant Examiner—Christopher Keehan
Attorney, Agent, or Firm—Banner & Witcoff, Ltd.

[57] ABSTRACT

In an apparatus for purifying raw water to provide purified water, a cylindrical outer electrode (152) surrounds a cylindrical inner electrode (151) in a water tank (102), storing the raw water, with a predetermined gap left therebetween. It is assumed that the raw water contains chlorine ions therein. A water channel (153a and 151a) passes the raw water from the water tank through the predetermined gap to an outlet port (122b) of the water tank. The inner and the outer electrodes are applied with a d.c. voltage therebetween. The d.c. voltage causes the raw water to be treated into the purified water in the predetermined gap by utilization of the chlorine ions.

27 Claims, 26 Drawing Sheets

| | 581 508 ON | 508 ON | 508 ON |
|---|---|---|---|
| POWER SUPPLY LEVEL SETTING SWITCH | ■ □ □ <br> □ ■ ■ <br> 1 2 3 OFF | □ ■ □ <br> ■ □ ■ <br> 1 2 3 OFF | □ □ ■ <br> ■ ■ □ <br> 1 2 3 OFF |
| WATER TEMPERATURE | < 12°C | 12°C ~ 28°C | > 28°C |

FIG. 12

| | 781 708 | 708 | 708 | 708 |
|---|---|---|---|---|
| POWER SUPPLY LEVEL SETTING SWITCH | ON<br>1  2 OFF | ON<br>1  2 OFF | ON<br>1  2 OFF | ON<br>1  2 OFF |
| AREA CODE | A | B | C | UNSET |
| | | | | OPERATION SUSPENDED |

WATER PURIFYING APPARATUS CAPABLE OF EFFECTIVELY AND RELIABLY PRODUCING PURIFIED WATER WITH A SMALL CHLORINE GENERATOR

BACKGROUND OF THE INVENTION

This invention relates to a water purifying apparatus for purifying raw water such as tap water and groundwater to provide purified water for domestic or business use.

A conventional water purifying apparatus comprises a tank for storing raw water such as tap water and a chlorine generator placed in the tank for generating hypochlorous acid. The tank is generally called a cistern in the art. The chlorine generator comprises a pair of electrodes which are arranged parallel to each other to serve as an anode and a cathode known in the art. It is assumed that the tap water contains chlorine ions.

The electrodes are applied with a d.c. voltage at a predetermined interval monitored or measured by a timer to electrolyze the raw water within the cistern. As a consequence, an appropriate amount of the hypochlorous acid is produced in the raw water with utilization of the chlorine ions in the manner known in the art. The hypochlorous acid serves as an effective chlorine or a component effective in sterilization. Thus, the raw water is sterilized into purified water.

At first, the raw water is reserved as reserved water in the cistern. Next, the d.c. voltage is applied between the electrodes to add the hypochlorous acid in the reserved water. Thus, all of the reserved water is purified into the purified water in the cistern. After that, the purified water is fed from the cistern through a pipe to a terminal unit such as a tap or a dispensing valve of a beverage dispenser.

In the conventional water purifying apparatus, the chlorine generator must be designed so as to be capable of generating a large amount of the hypochlorous acid. This is because all of the reserved water must always be maintained into a purified condition in the cistern. It is therefore difficult to reduce the size of the chlorine generator. This results in inevitable increasing of the cistern in size.

SUMMARY OF THE INVENTION

It is an object of this invention to provide a water purifying apparatus which is capable of effectively and reliably producing purified water.

It is another object of this invention to provide a water purifying apparatus of the type described, in which a chlorine generator can be designed to have a small size.

It is still another object of this invention to provide a water purifying apparatus of the type described, which can be designed to have a small size.

Other objects of this invention will become clear as the description proceeds.

An apparatus to which this invention is applicable is for purifying raw water to provide purified water. It is assumed that the raw water contains chlorine ions. The apparatus comprises a water tank for storing the raw water, an outlet port connected to the water tank for discharging the purified water from the water tank, a cylindrical inner electrode placed in the water tank, a cylindrical outer electrode placed in the water tank to surround the inner electrode with a predetermined gap left therefrom, a water channel for passing the raw water from the water tank to the outlet port through the predetermined gap, and voltage applying means connected to the inner and the outer electrodes for applying a d.c. voltage between the inner and the outer electrodes. The d.c. voltage causes the raw water to be treated into the purified water in the predetermined gap by utilization of the chlorine ions.

BRIEF DESCRIPTION OF THE DRAWING

FIG. 12 is a view for describing a power supply level setting switch of a water purifying apparatus according to a fifth embodiment of this invention;

FIG. 16 is a view for describing a power supply level setting switch of a water purifying apparatus according to seventh embodiment of this invention;

DESCRIPTION OF THE PREFERRED EMBODIMENTS

Figure 1:
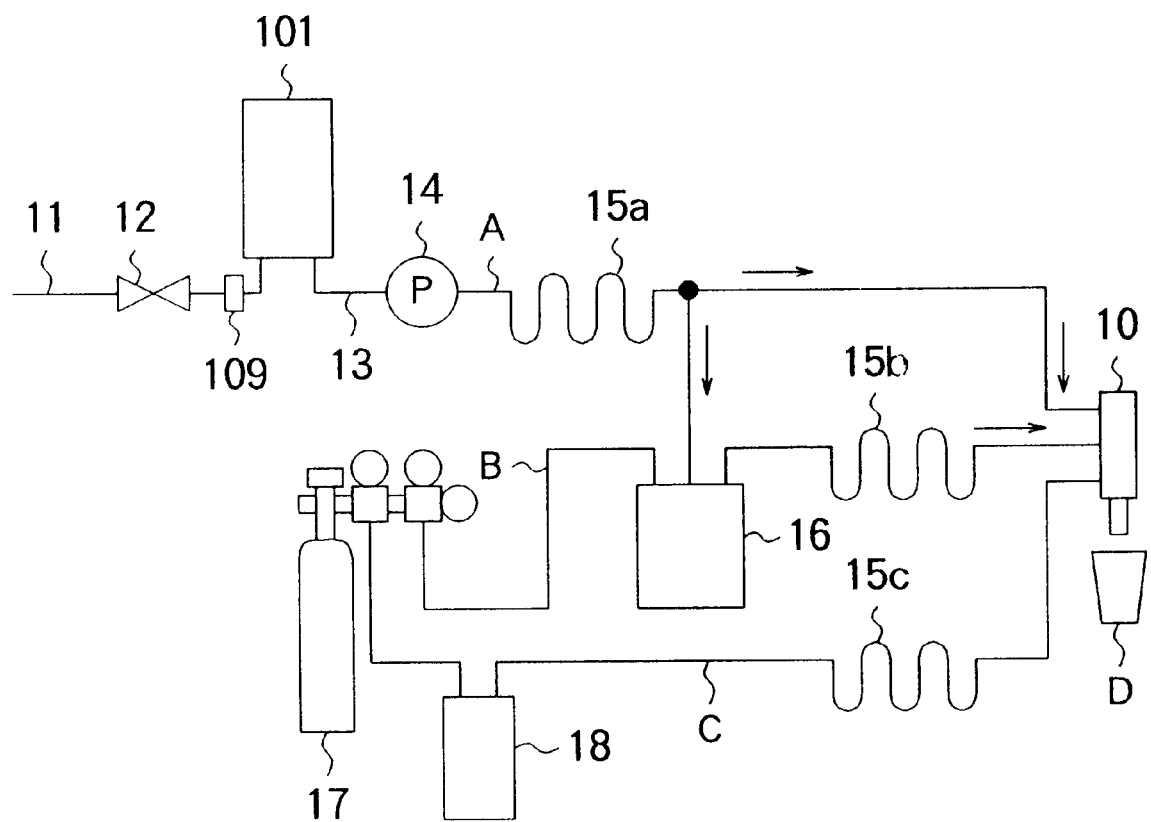
FIG. 1 is a schematic view of a beverage dispenser which includes a water purifying apparatus according to a first embodiment of this invention.

Now, description will be made about this invention with reference to the drawing in conjunction with several preferred embodiments thereof.

At first referring to FIG. 1, a water purifying apparatus 101 according to a first embodiment of this invention is equipped in a beverage dispenser for producing and vending a beverage, such as juice and coffee, in response to a vending signal. The water purifying apparatus 101 is supplied with tap water as raw water to produce purified water or chlorinated water which contains an appropriate amount of chlorine having a sterilizing effect and which is therefore adapted for use as drinking water. In the manner known in the art, the tap water contains chlorine ions.

As illustrated in FIG. 1, the beverage dispenser comprises, in addition to the water purifying apparatus 101, a dispensing valve 10, a water supply pipe 11, a water supply valve 12, a water outlet pipe 13, a water pump 14, first through third cooling coils 15a, 15b, and 15c, a carbonator 16, a carbonic-acid gas cylinder 17, and a syrup tank 18. These components are connected via a pipeline circuit comprising a dilution water line A for supplying dilution water, a carbonic water line B for producing carbonic water, and a syrup line C for supplying syrup. The dilution water, the carbonic water, and the syrup are supplied through the lines A, B, and C to the dispensing valve 10 where they are appropriately mixed to produce the beverage such as a carbonic beverage. The beverage is poured from the dispensing valve 10 into a cup D.

Along the dilution water line A, the raw water is supplied from the water supply pipe 11 through the water supply valve 12 into the water purifying apparatus 101 where the raw water is processed into the chlorinated water. At every vending operation, the chlorinated water in the water purifying apparatus 101 is pumped by the water pump 14 and cooled by the first cooling coil 15a to be supplied to the dispensing valve 10 as the dilution water on one hand.

On the other hand, a part of the chlorinated water cooled by the first cooling coil 15a is introduced into the carbonator 16. Along the carbonic water line B, the carbonator 16 is also supplied with a carbonic-acid gas from the carbonic-acid gas cylinder 17 so that the chlorinated water is mixed with the carbonic-acid gas to produce the carbonic water. The carbonic water is cooled by the second cooling coil 15b to be supplied to the dispensing valve 10.

Through the syrup line C, the syrup is taken out from the syrup tank 18 and cooled by the third cooling coil 15c to be supplied to the dispensing valve 10. It is noted here that the syrup tank 18 is connected to the carbonic-acid gas cylinder 17 so that carbonic syrup can be produced in the syrup tank 18 and supplied to the dispensing valve 10.

The water supply pipe 11 is provided with a flow rate sensor such as a flow rate switch 109 which will be referred to as a flow detecting arrangement for detecting a flow rate of the raw water. When the flow rate of the raw water in the water supply pipe 11 exceeds a predetermined flow rate, i.e., when the dispensing valve 10 is opened to trigger the flow of water in the pipeline circuit, the flow rate switch 109 is turned on to produce a flow rate detection signal. In this event, the water supply valve 12 is opened to supply the raw water to the water purifying apparatus 101.

Figure 2:
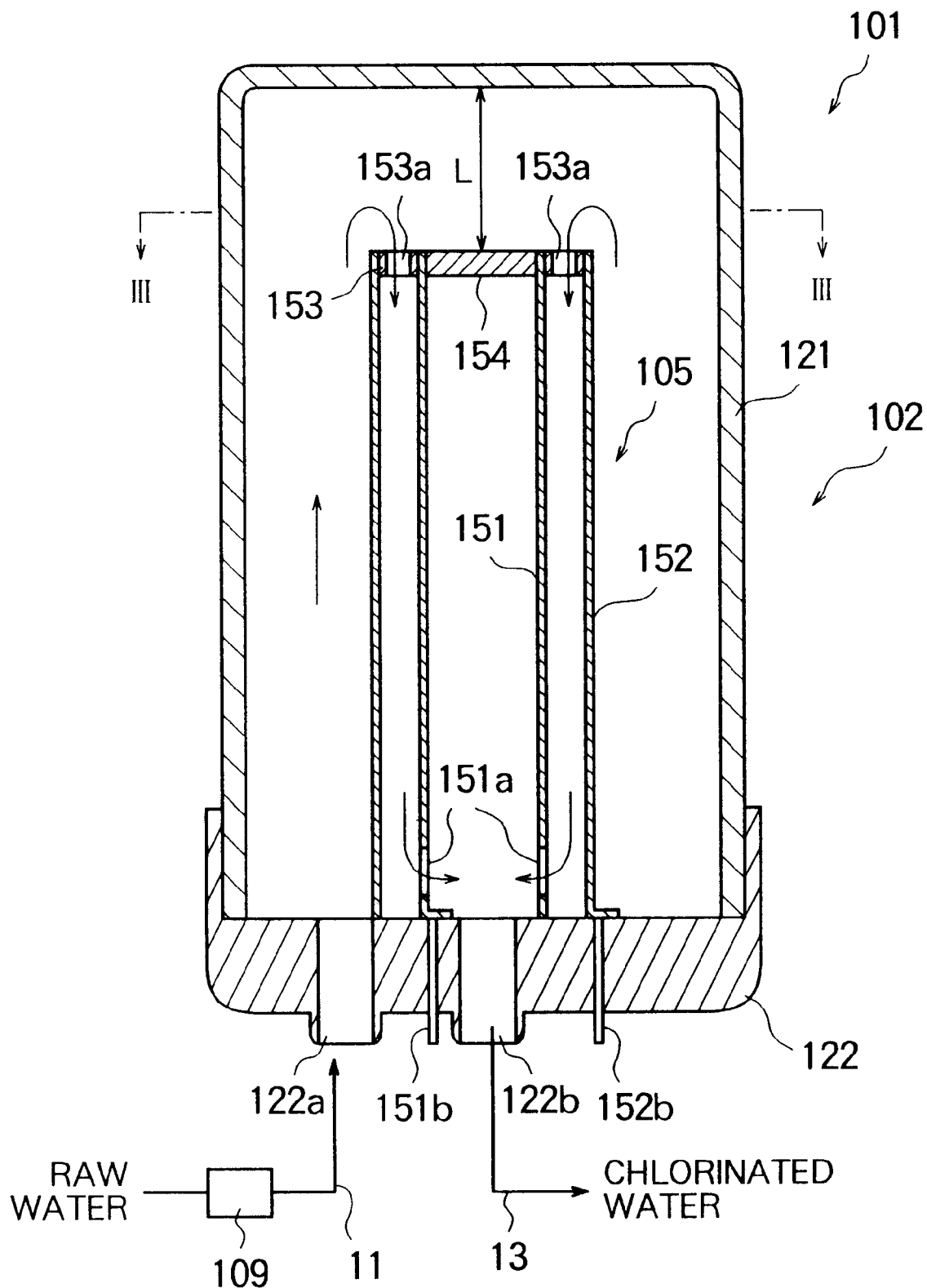
FIG. 2 is a sectional view of the water purifying apparatus illustrated in FIG. 1.

Next referring to FIG. 2, the water purifying apparatus 101 comprises a cylindrical water tank 102 of a closed structure. The water tank 102 comprises a cup-shaped member or a housing 121 extending in a vertical direction and having an open end at its lower end, and a cap 122 engaged with the housing 121 to close the open end of the housing 121. The cap 122 is provided with an inlet port 122a formed near its peripheral edge to introduce the raw water from the water supply pipe 11 into the housing 121. The cap 122 is also provided with an outlet port 122b formed at its center to deliver the chlorinated water as the drinking water from the housing 121 through the water outlet pipe 13 towards the dispensing valve 10. The cap 122 is made of an electrical insulating material such as resin.

In the water tank 102 of the above-mentioned structure, an electrode unit 105 is mounted on the cap 122. The electrode unit 105 comprises a cylindrical inner electrode 151 and a cylindrical outer electrode 152 concentrically arranged around the inner electrode 151 with a predetermined gap (3 to 5 mm) kept therefrom. Each of the inner and the outer electrodes 151 and 152 comprises a titanium base material coated with platinum or a platinum alloy (including platinum-iridium). The predetermined gap is of a cylindrical shape extending in the vertical direction. In the manner which will later become clear, the electrode unit 105 serves as a chlorine generator.

Figure 3:
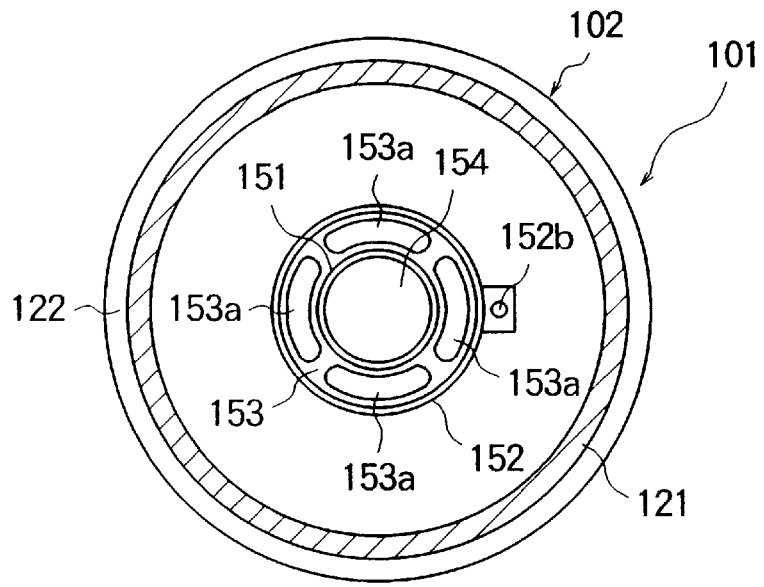
FIG. 3 is a sectional view taken along a line III-III in FIG. 2.

Referring to FIG. 3 in addition to FIG. 2, an annular fastening plate 153 is fitted to top ends of the inner and the outer electrodes 151 and 152 to cover an annular upper opening defined between the top ends of the inner and the outer electrodes 151 and 152. The fastening plate 153 serves to keep the predetermined gap between the inner and the outer electrodes 151 and 152. In addition, a circular electrode cap 154 is fitted to the top end of the inner electrode 151 to close a circular upper opening defined inside the top end of the inner electrode 151. The electrode cap 154 serves to prevent the raw water from flowing through the circular upper opening into the inside of the inner electrode 151.

Figure 4:
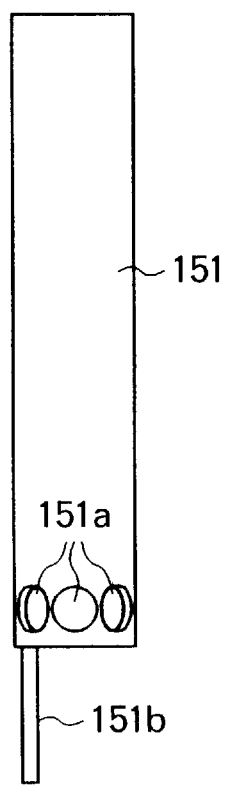
FIG. 4 is a front view of an inner electrode illustrated in FIG. 2.

As best shown in FIG. 2, the fastening plate 153 is provided with a plurality of entrance holes 153a. On the other hand, the inner electrode 151 is provided with a plurality of exit holes 151a formed at its lower portion as illustrated in FIGS. 2 and 4. The raw water supplied to the water tank 102 flows from an outer space outside the outer electrode 152 through the entrance holes 153a into an intermediate space between the inner and the outer electrodes 151 and 152. After the raw water is processed within the intermediate space into the chlorinated water, the chlorinated water flows through the exit holes 151a into an inner space which is inside the inner electrode 151 and has an upper end closed by the electrode cap 154. In this event, the electrode cap 154 will be referred to as a closing arrangement.

A combination of the entrance holes 153a, the interspace between the inner and the outer electrodes 151 and 152, and the exit holes 151a forms a water channel between the outer space outside the outer electrode 152 and the inner space inside the inner electrode 151. The inner and the outer electrodes 151 and 152 have electrode terminals 151b and 152b attached to their lower ends, respectively. The electrode terminals 151b and 152b penetrate the cap 122 in a sealed condition to be connected to a d.c. power supply 119 which will later be described. The inner and the outer electrodes 151 and 152 are smaller in height than the housing 121 to form a space above the inner and the outer electrodes 151 and 152 as represented by a length L in the figure.

Figure 5:
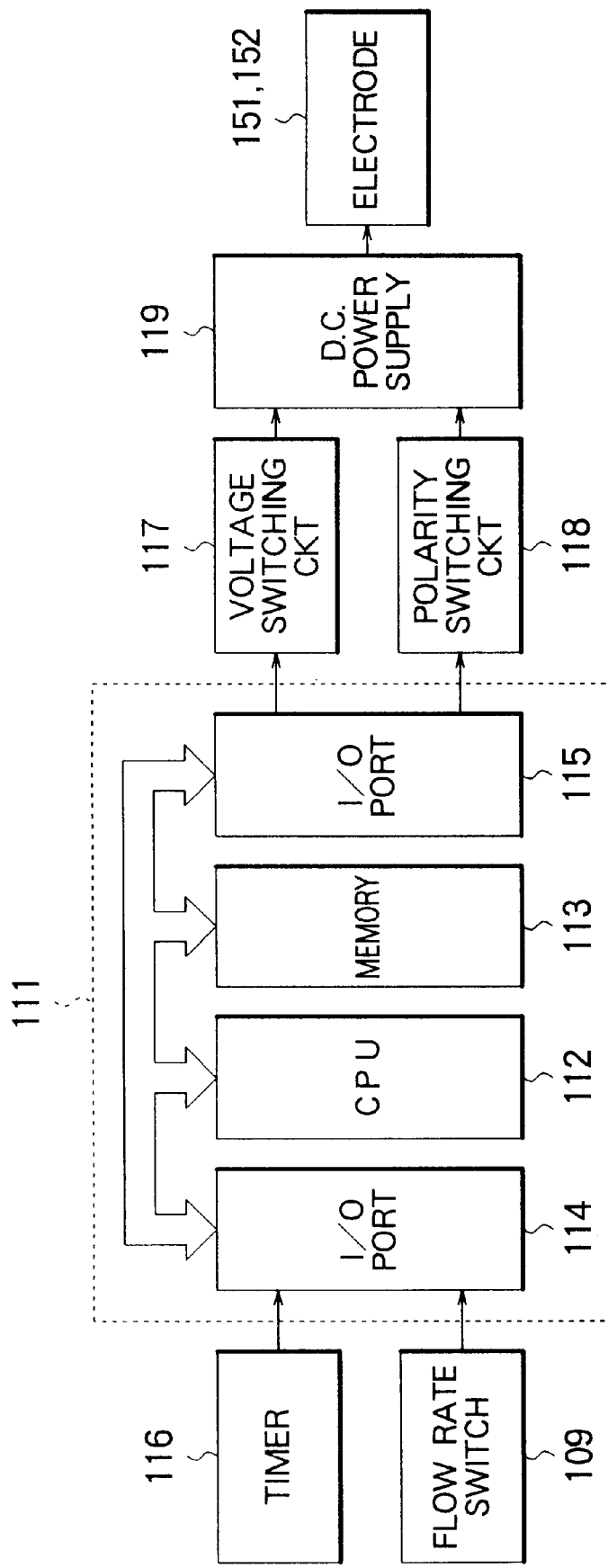
FIG. 5 is a block diagram of a control section of the water purifying apparatus illustrated in FIG. 2.

Next referring to FIG. 5, description will be made about a control section of the water purifying apparatus 101 according to the first embodiment.

The water purifying apparatus 101 comprises a control unit 111 implemented by a microcomputer and is automatically operated. The control unit 111 comprises a central processing unit (CPU) 112 and a memory 113 storing a control program. The control unit 111 has I/O ports 114 and 115. The I/O port 114 is for input of signals from the flow rate switch 109 and a timer 116 while the I/O port 115 is for output of signals to a voltage switching circuit 117 and a polarity switching circuit 118.

The timer 116 is for monitoring a first time period during which a standard-polarity voltage is applied and a second time period during which a reverse-polarity voltage is applied to switch the polarity of each of the inner and the outer electrodes 151 and 152 through the polarity switching circuit 118 and the d.c. power supply 119. When the standard-polarity voltage is applied, the inner and the outer electrodes 151 and 152 act as an anode and a cathode, respectively. On the other hand, when the reverse-polarity voltage is applied, the inner and the outer electrodes 151 and 152 act as a cathode and an anode, respectively. The voltage switching circuit 117 is for switching a voltage level between a high level (for example, 20V) and a low level (for example, 10V) and will be referred to as a voltage adjusting arrangement. A combination of the control unit 111, the voltage switching circuit 117, and the polarity switching circuit 118 is referred to as a voltage applying arrangement. Alternatively, a current level may be switched between a high level (for example, 1.0 A) and a low level (for example, 0.4 A).

Figure 6A:
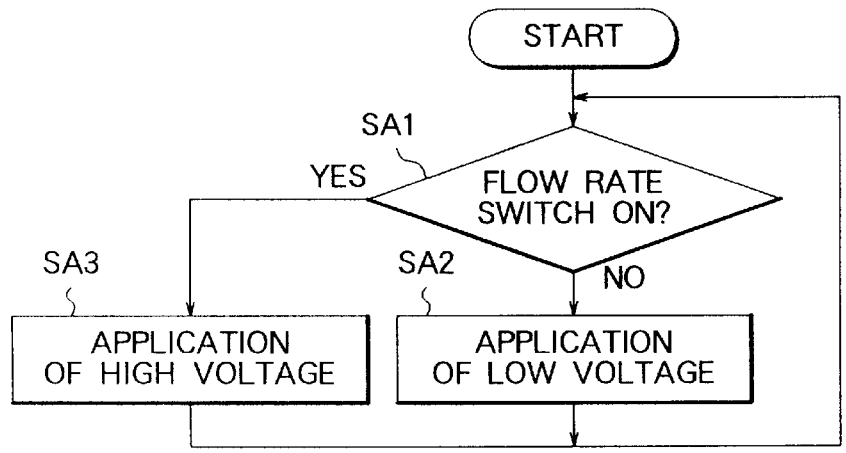
FIGS. 6A and 6B are flow charts for describing a control operation by the control section illustrated in FIG. 5.
Figure 6B:
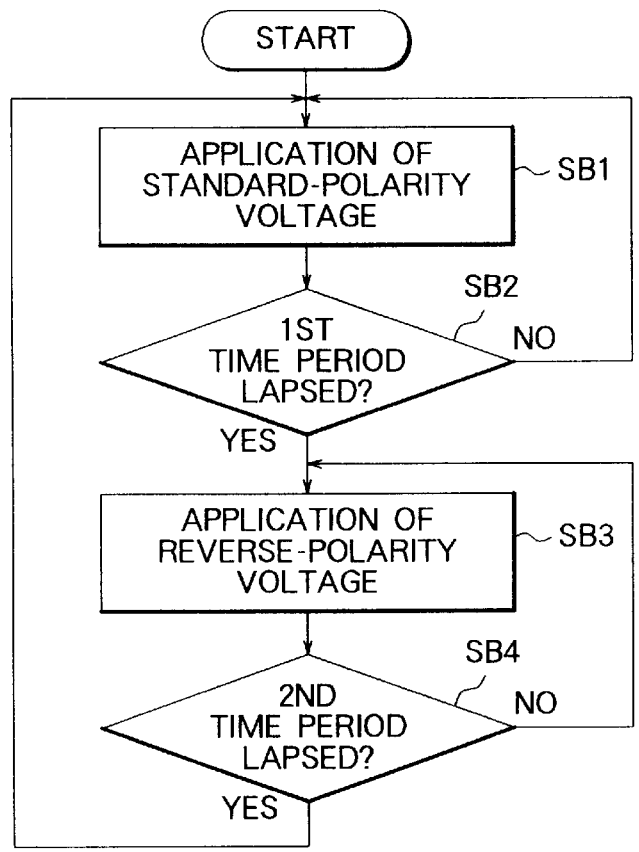

Referring to FIGS. 6A and 6B, description will be made about operation of the control section.

As shown in FIG. 1, in a step SA1, judgement is made about whether or not the flow rate switch 109 is turned on. When the flow rate switch 109 is turned off, i.e., when the dispensing valve 10 is not opened and the beverage dispenser is in a standby state, the step SA1 proceeds to a step SA2. In the step SA2, the inner and the outer electrodes 151 and 152 are applied with a d.c. voltage of a low level therebetween. Generally, while the raw water is reserved in the water tank 102 during the standby state, hypochlorous acid contained in the raw water is reduced with lapse of time. In order to compensate the reduction, a sufficient amount of hypochlorous acid is obtained by moderate electrolysis performed under the d.c. voltage of a low level.

On the other hand, when the flow rate switch 109 is turned on, i.e., when the dispensing valve 10 is opened, the step SA1 proceeds to a step SA3. In the step SA3, the inner and the outer electrodes 151 and 152 are applied with a d.c. voltage of a high level. At this time, as depicted by solid arrows in FIG. 2, the raw water is supplied from the water supply pipe 11 through the inlet port 122a into the housing 121 so that reserved water already supplied as the raw water and reserved in the housing 121 is forced to flow through the entrance holes 153a, the intermediate space between the inner and the outer electrodes 151 and 152, the exit holes 151a, and the outlet port 122b to be pushed out into the water outlet pipe 13 after processed into the chlorinated water. Thus, the chlorinated water containing an appropriate amount of hypochlorous acid is supplied to the dispensing valve 10.

If a vending operation is consecutively repeated a number of times, a stock of the chlorinated water produced during the standby state is substantially completely exhausted. However, during the water supply, the inner and the outer electrodes 151 and 152 are applied with the d.c. voltage of a high level. Therefore, the raw water supplied from the water supply pipe 11 is sufficiently electrolyzed to contain an appropriate amount of hypochlorous acid while passing through the intermediate space between the inner and the outer electrodes 151 and 152. It is thus possible to avoid a decrease in sterilizing effect.

As described above, the water purifying apparatus 101 according to this embodiment has dual functions as a cistern-type water purifying apparatus for producing hypochlorous acid in still water reserved in the water tank 102 during the standby state and as a channel-type water purifying apparatus for producing hypochlorous acid in running water flowing through the water channel during the water supply.

Referring to FIG. 6B, the water purifying apparatus 101 of this embodiment is also controlled to alternately apply the standard-polarity voltage and the reverse-polarity voltage. Specifically, in a step SB1, application of the standard-polarity voltage is started. The step SB1 is followed by a step SB2 in which judgement is made about whether or not the first time period has lapsed. If the first time period has lapsed, the step SB2 proceeds to a step SB3 to start application of the reverse-polarity voltage. In a step SB4 following the step SB3, judgement is made about whether or not the second time period has lapsed. If the second time period has lapsed, the step SB4 returns to the step SB1. In this manner, it is possible to effectively remove scales adhered to each of the inner and the outer electrodes 151 and 152 when it acts as the anode. Thus, efficiency of the electrolysis is prevented from being degraded due to presence of the scales.

Each of the inner and the outer electrodes 151 and 152 is smaller in height than the housing 121 to leave the upper space depicted by the length L above the inner and the outer electrodes 151 and 152. With this structure, resultant gases such as oxygen and hydrogen produced by the electrolysis are accumulated in this space and are not contained in the chlorinated water to be supplied to the dispensing valve 10. Thus, it is possible to prevent fluctuation in beverage supply amount due to the mixture of the gases.

The cap 122 is provided with the inlet port 122a and the outlet port 122b as well as the inner and the outer electrodes 151 and 152. It is therefore possible to accurately position each of the inner and the outer electrodes 151 and 152 with respect to the inlet and the outlet ports 122a and 122b and to accurately determine the gap between the inner and the outer electrodes 151 and 152.

Figure 7:
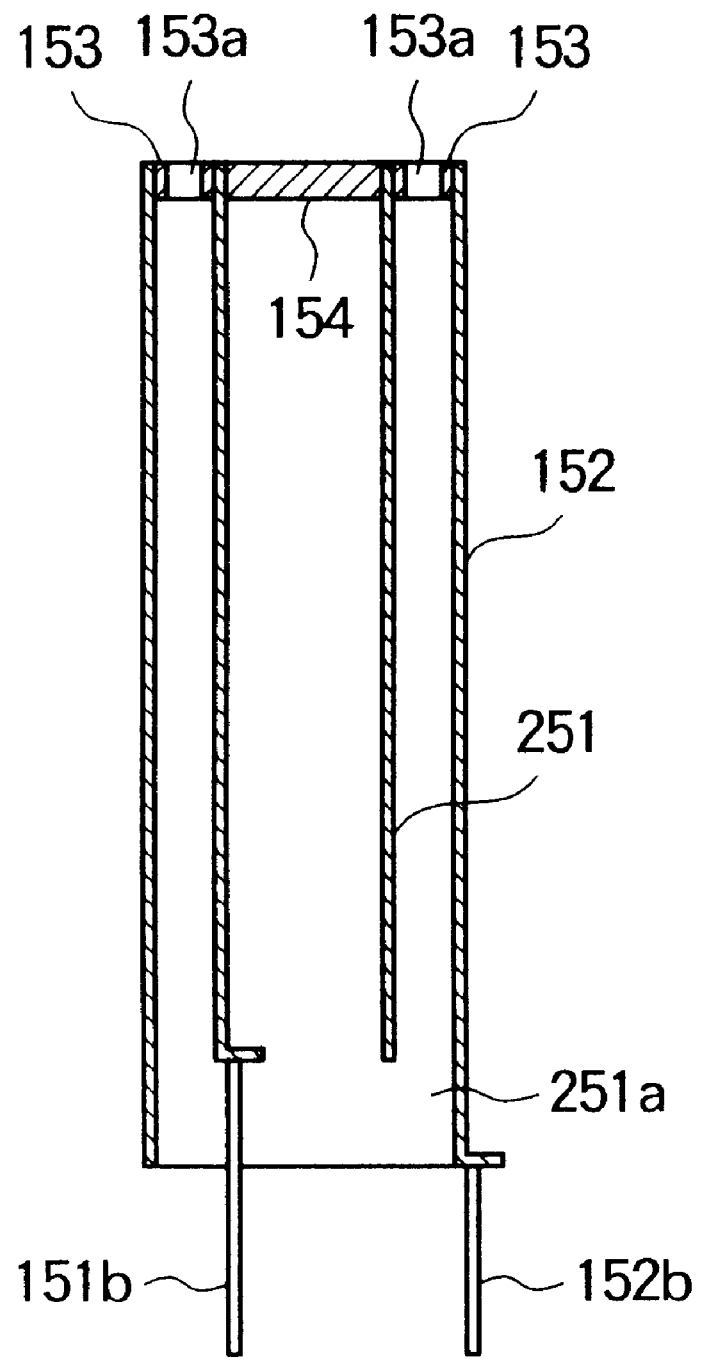
FIG. 7 is a sectional view of an electrode unit of a water purifying apparatus according to a second embodiment of this invention.

Referring to FIG. 7, an electrode unit of a water purifying apparatus according to a second embodiment of this invention is substantially similar in structure to the water purifying apparatus 101 of the first embodiment. Similar parts are designated by like reference numerals and will not be described any longer.

In this embodiment, the inner electrode 151 with the exit holes 151a in the first embodiment is replaced by an inner electrode 251 with an exit opening 251a. Specifically, the inner electrode 251 is smaller in height than the outer electrode 152 to leave a gap between an upper surface of a cap 122 and a lower end of the inner electrode 251. The gap serves as the exit opening 251a. With this structure, the exit opening 251a can be formed without a boring process required in forming the exit holes 151a in the first embodiment.

Figure 8:
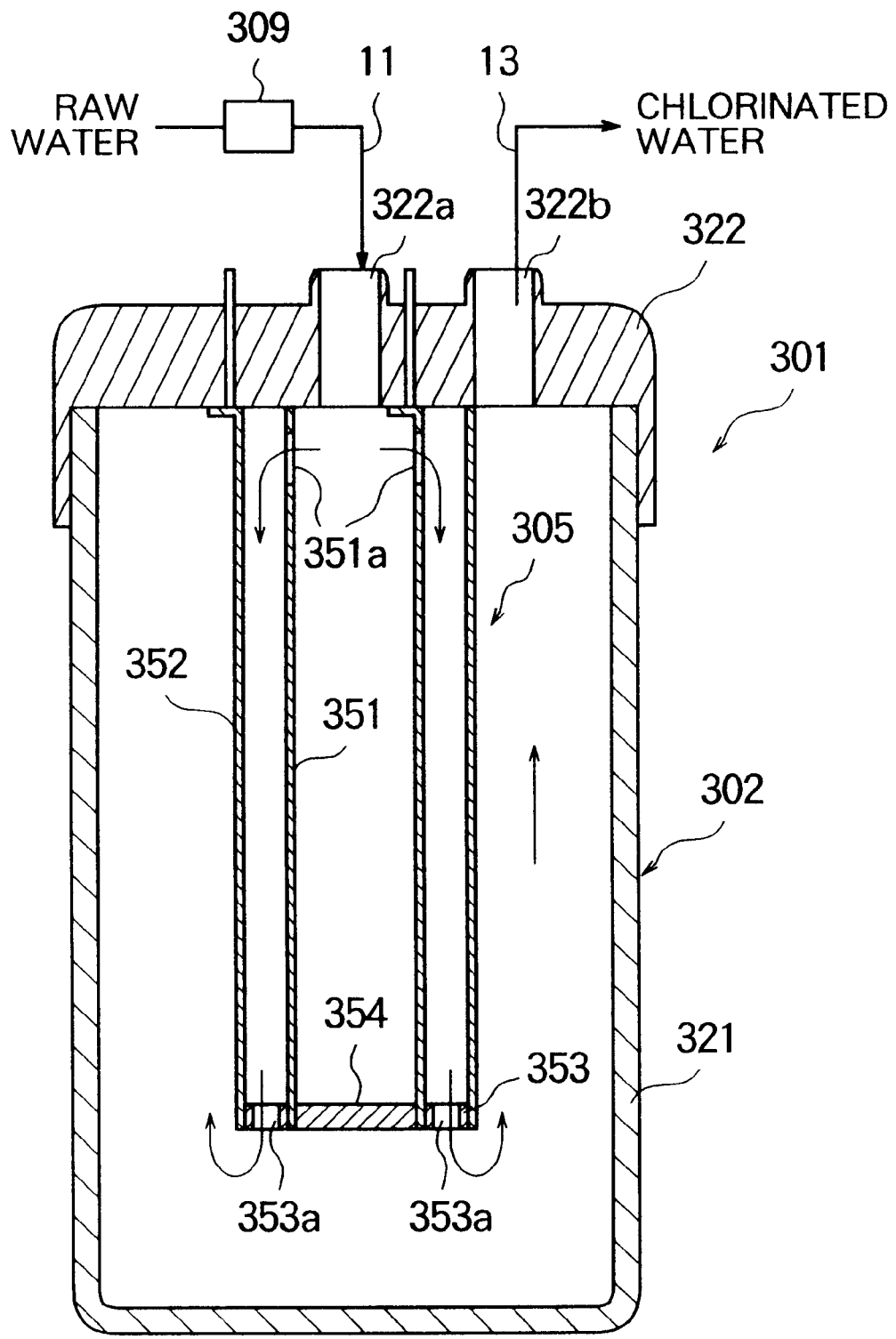
FIG. 8 is a sectional view of a water purifying apparatus according to a third embodiment of this invention.

Referring to FIG. 8, a water purifying apparatus 301 according to a third embodiment of this invention comprises a cylindrical water tank 302 similar in structure to that of the first embodiment but reversed in vertical position. Specifically, the water tank 302 comprises a housing 321 opened at its upper end, and a cap 322 engaged with the upper end of the housing 321 to close the housing 321. The cap 322 is provided with an inlet port 322a formed at its center to introduce the raw water from the water supply pipe 11 into the housing 321. The cap 322 is also provided with an outlet port 322b formed near its peripheral edge to deliver the chlorinated water as the drinking water from the housing 321 through the water outlet pipe 13 towards the dispensing valve 10.

The water purifying apparatus 301 further comprises an electrode unit 305. The electrode unit 305 comprises a cylindrical inner electrode 351 and a cylindrical outer electrode 352 concentrically arranged around the inner electrode 351 with a predetermined gap kept therefrom. An annular fastening plate 353 is fitted to bottom ends of the inner and the outer electrodes 351 and 352. In addition, a circular electrode cap 354 is fitted to the bottom end of the inner electrode 351. The inner electrode 351 is provided with a plurality of entrance holes 351a while the fastening plate 353 is provided with a plurality of exit holes 353a. A flow rate sensor 309 is attached to the water supply pipe 11 to detect the flow rate of the raw water in the water supply pipe 11.

As depicted by solid arrows in FIG. 8, the raw water flows through the inlet port 322a into an inner space inside the inner electrode 351 and then through the entrance holes 351a into an intermediate space between the inner and the outer electrodes 351 and 352 to be subjected to electrolysis. As a result of the electrolysis, the chlorinated water is produced and flows from the intermediate space through the exit holes 353a to an outer space outside the outer electrode 352 to be delivered through the outlet port 322b to the dispensing valve 10. Thus, the flow of water within the water tank 302 is directed from the inner space to the outer space. Other structure is similar to that of the first embodiment.

In each of the foregoing embodiments, the gap between the inner and the outer electrodes is defined by the single fastening plate. However, in dependence upon a vertical dimension of each electrode, a plurality of similar fastening plates may be fitted. The exit holes in the first embodiment have a circular shape but may be of any other appropriate shape. Although the flow rate switch is used to detect the flow rate in each of the foregoing embodiment, use may be made of any other flow rate sensor as far as the flow rate can be detected. For example, use may be made of a rotary-vane flow rate sensor comprising a rotary vane rotated by water flow. The rotation is continuously monitored to produce a water volume signal. Alternatively, a pressure switch for detecting the flow rate from hydraulic pressure can be used. Use may be made of another detecting arrangement which is for detecting presence or absence of a water flow of at least one of the raw water and the purified water. In this event, the control unit 111 controls the voltage switching circuit 117 to apply the d.c. voltage of a low level and a high level in absence of the water flow and in presence of the water flow, respectively.

Figure 9:
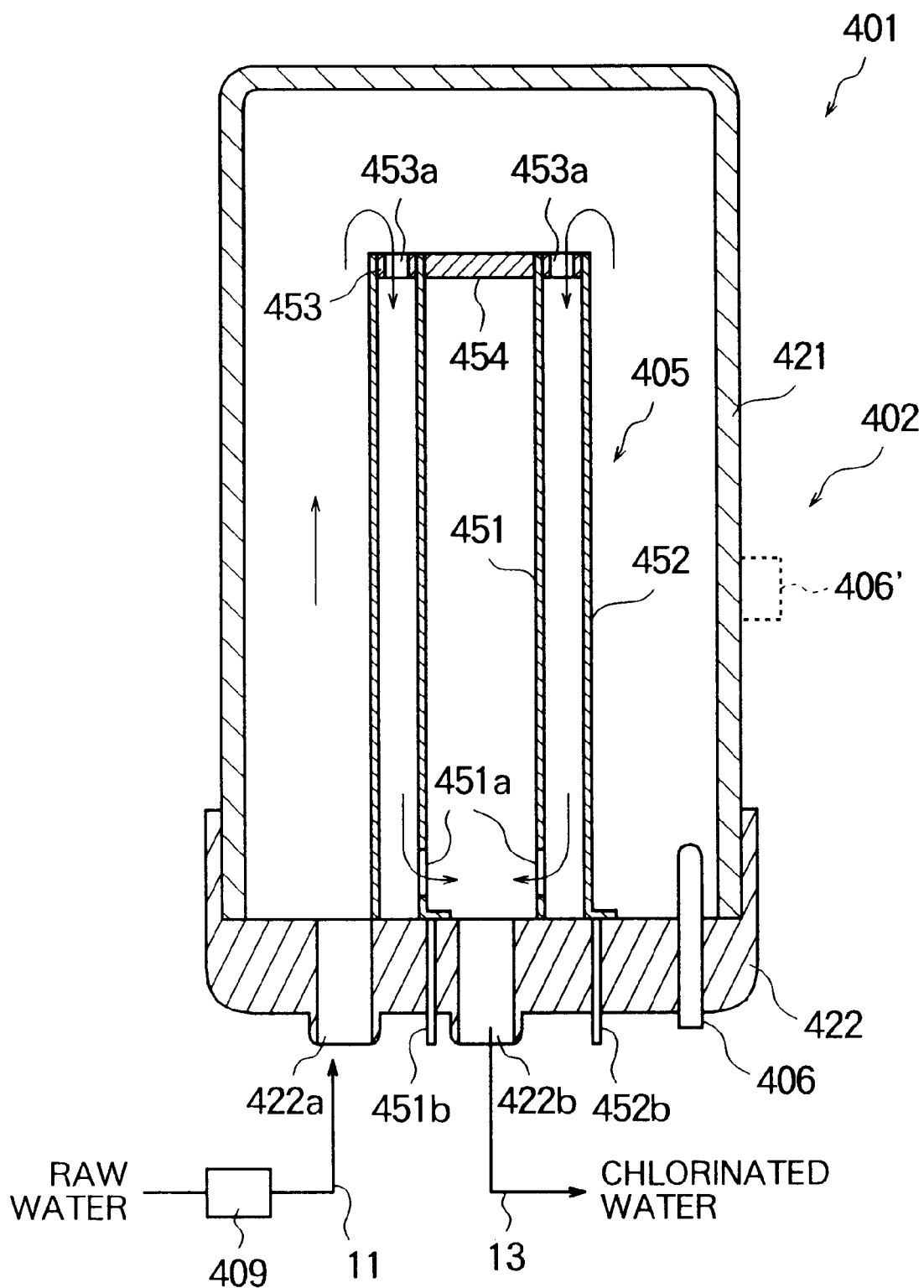
FIG. 9 is a sectional view of a water purifying apparatus according to a fourth embodiment of this invention.

Referring to FIG. 9, a water purifying apparatus 401 according to a fourth embodiment of this invention comprises a cylindrical water tank 402 of a closed structure. The water tank 402 comprises a cup-shaped member or a housing 421 having an open end at its lower end, and a cap 422 engaged with the lower end of the housing 421 to close the housing 421. The cap 422 is provided with an inlet port 422a formed near its peripheral edge to introduce the raw water from the water supply pipe 11 into the housing 421. The cap 422 is also provided with an outlet port 422b formed at its center to deliver the chlorinated water as the drinking water from the housing 421 through the water outlet pipe 13 towards the dispensing valve 10.

The cap 422 is made of an electrical insulating material such as resin. The water supply pipe 11 is provided with a flow rate sensor 409. When the flow rate of the raw water in the water supply pipe 11 exceeds a predetermined flow rate, i.e., when the dispensing valve 10 is opened to trigger the flow of water in the pipeline circuit, the flow rate sensor 409 produces a flow rate detection signal.

In the water tank 402 of the above-mentioned structure, an electrode unit 405 is mounted on the cap 422. The electrode unit 405 comprises a cylindrical inner electrode 451 and a cylindrical outer electrode 452 concentrically arranged around the inner electrode 451 with a predetermined gap (3 to 5 mm) kept therefrom. Each of the inner and the outer electrodes 451 and 452 comprises a titanium base material coated with platinum or a platinum alloy (including platinum-iridium). An annular fastening plate 453 is fitted to top ends of the inner and the outer electrodes 451 and 452 to cover an annular upper opening defined between the top ends of the inner and the outer electrodes 451 and 452. The fastening plate 453 serves to keep the predetermined gap between the inner and the outer electrodes 451 and 452. In addition, a circular electrode cap 454 is fitted to the top end of the inner electrode 451 to close a circular upper opening defined inside the top end of the inner electrode 451. The electrode cap 454 serves to prevent the raw water from flowing through the circular upper opening into the inside of the inner electrode 451.

The fastening plate 453 is provided with a plurality of entrance holes 453a. On the other hand, the inner electrode 451 is provided with a plurality of exit holes 451a formed at its lower portion. The raw water supplied to the water tank 402 flows from an outer space outside the outer electrode 452 through the entrance holes 453a into an intermediate space between the inner and the outer electrodes 451 and 452. After the raw water is processed within the intermediate space into the chlorinated water, the chlorinated water flows through the exit holes 451a into an inner space inside the inner electrode 451. Thus, a combination of the entrance holes 453a, the intermediate space between the inner and the outer electrodes 451 and 452, and the exit holes 451a forms a water channel between the outer space outside the outer electrode 452 and the inner space inside the inner electrode 451. The inner and the outer electrodes 451 and 452 have electrode terminals 451b and 452b attached to their lower ends, respectively. The electrode terminals 451b and 452b penetrate the cap 422 in a sealed condition to be connected to a d.c. power supply 419.

In addition, the cap 422 is provided with a temperature sensor 406 penetrating the cap 422. The temperature sensor 406 detects a water temperature within the water tank 402 as a detected temperature to produce a temperature detection signal representative of the detected temperature. The temperature sensor 406 may be replaced by a temperature sensor 406' attached to the housing 421 of the water tank 402 as depicted by a dotted line in FIG. 9 to detect the water temperature within the water tank 402 through the housing 421.

Figure 10:
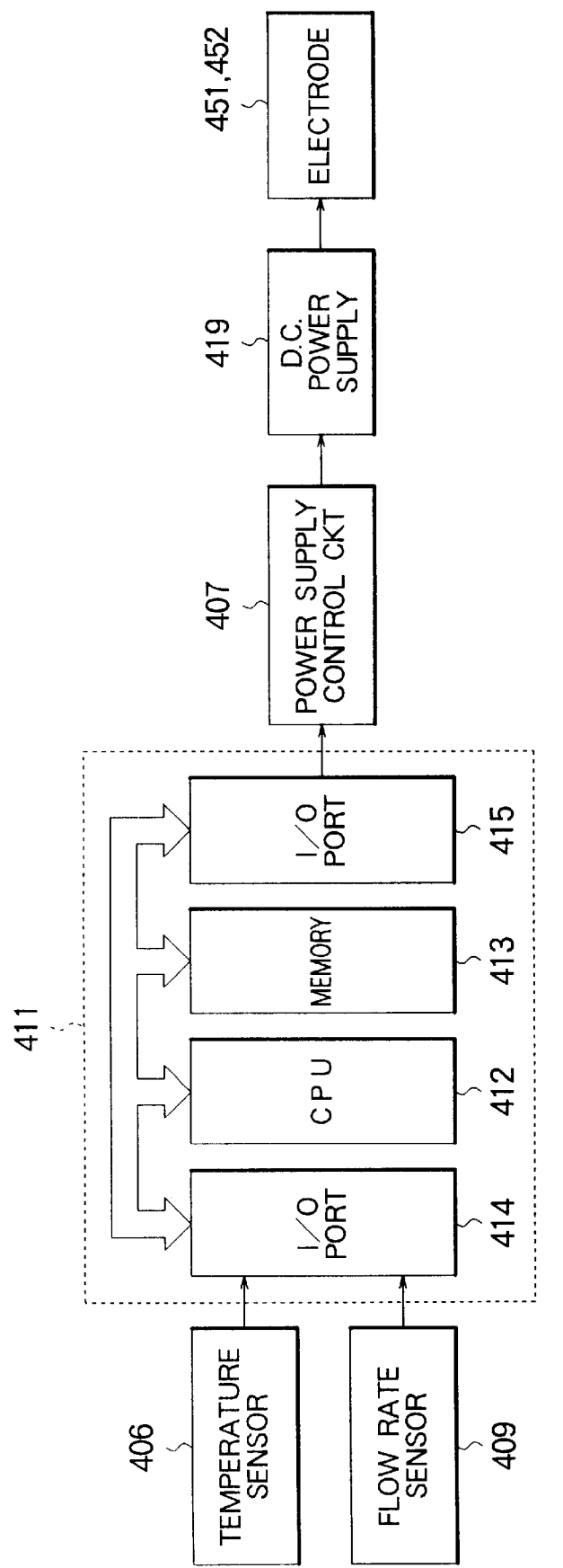
FIG. 10 is a block diagram of a control section of the water purifying apparatus illustrated in FIG. 9.

Next referring to FIG. 10, description will be made about a control section of the water purifying apparatus 401 according to the fourth embodiment.

The water purifying apparatus 401 comprises a control unit 411 implemented by a microcomputer and is automatically operated. The control unit 411 comprises a central processing unit (CPU) 412 and a memory 413 storing a control program. The control unit 411 has I/O ports 414 and 415. The I/O port 414 is for input of signals from the flow rate sensor 409 and the temperature sensor 406 while the I/O port 415 is for output of a signal to a power supply control circuit 407 for controlling a power level to each of the inner and the outer electrodes 451 and 452. The power supply control circuit 407 will be referred to as a power adjusting arrangement.

When the detected temperature (t) falls within the range between 12° C. and 28° C. (12° C.$\leq$t $\leq$28° C.), the power supply control circuit 407 controls the d.c. power supply 419 to supply each of the inner and the outer electrodes 451 and 452 with a standard electrolytic current of 1.2 A. It is noted here that the standard electrolytic current assures an effective chlorine concentration between 0.7 ppm and 1.1 ppm having both a sterilizing effect and a potability. When the detected temperature (t) is lower than 12° C. (t<12° C.), natural decomposition of effective chlorine is weakened. In this event, the effective chlorine concentration becomes greater than a desired level if the standard electrolytic current is supplied. Therefore, the power supply control circuit 407 determines to supply a low electrolytic current of, for example, 0.8 A so as to suppress generation of effective chlorine by the electrolysis. On the other hand, when the detected temperature (t) is higher than 28° C., natural decomposition of effective chlorine is accelerated. In this event, the effective chlorine concentration becomes lower than the desired level if the standard electrolytic current is supplied. Therefore, the power supply control circuit 407 determines to supply a high electrolytic current of, for example, 2 A so as to promote the generation of effective chlorine by the electrolysis.

Figure 11:
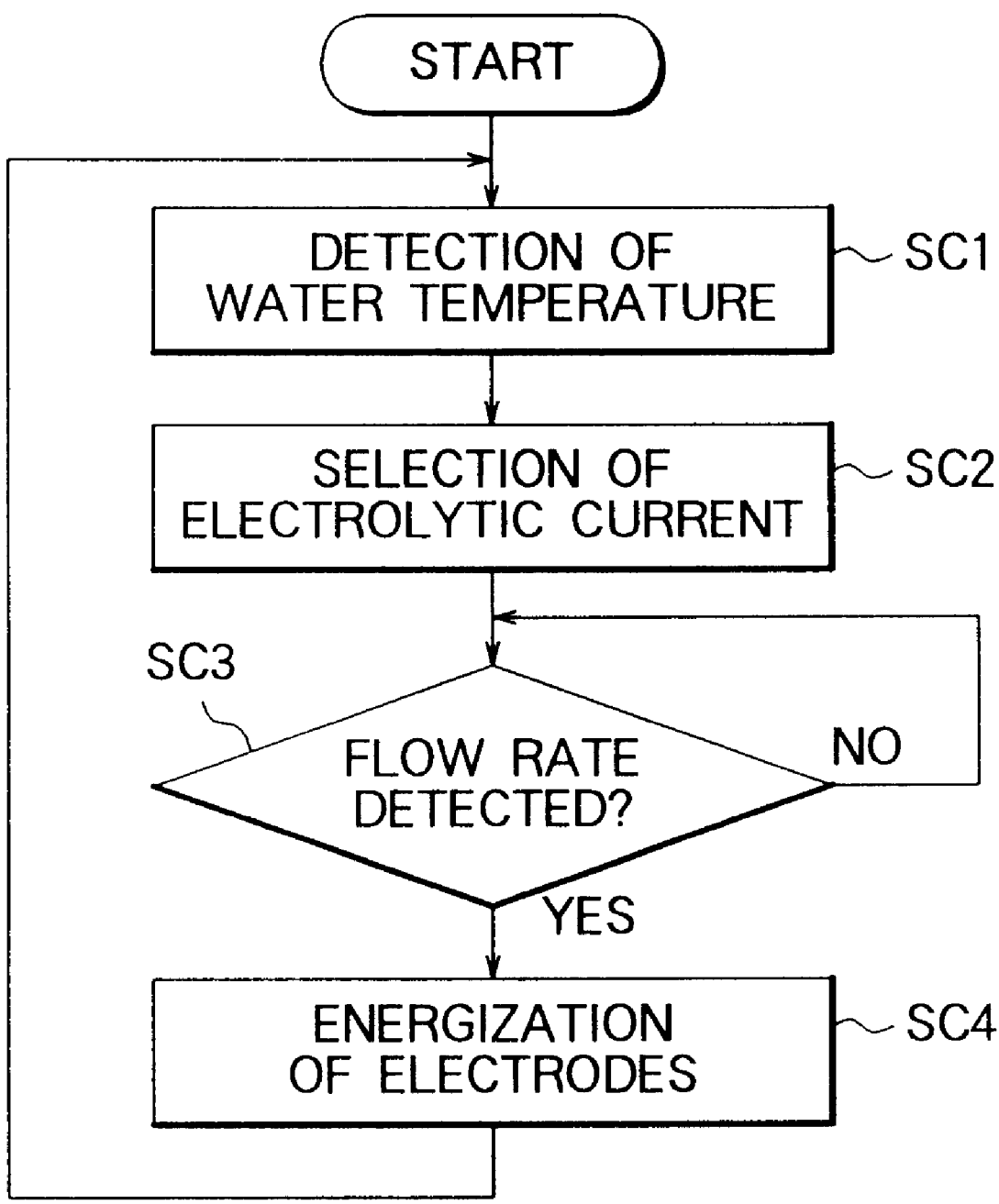
FIG. 11 is a flow chart for describing a control operation by the control section illustrated in FIG. 10.

Turning to FIG. 11, operation of the water purifying apparatus 401 will be described. At first, the water purifying apparatus 401 is turned on to be put into a standby state. In a step SC1, the water temperature in the water tank 402 is detected as the detected temperature. In the step SC2 following the step SC1, one of the standard, the low, and the high electrolytic currents is selected as a selected electrolytic current with reference to the detected temperature. Specifically, when the detected temperature (t) falls within the range between 12° C. and 28° C. (12° C.$\leq$t$\leq$28° C.), the standard electrolytic current of 1.2 A is selected. When the detected temperature (t) is lower than 12° C. (t<12° C.), the low electrolytic current of 0.8 A is selected. When the detected temperature (t) is higher than 28° C. (t>28° C.), the high electrolytic current of 2 A is selected.

In a step SC3 following the step SC2, judgement is made about whether or not the water flow in the water supply pipe 11 is detected by the flow rate sensor 409, i.e., whether or not the dispensing valve 10 is opened. If the water flow is detected, the water supply valve 12 is opened and the step SC3 is followed by a step SC4 in which the selected electrolytic current is supplied to each of the inner and the outer electrodes 451 and 452. At this time, the raw water is supplied from the water supply pipe 11 through the inlet port 422a into the housing 421 so that reserved water already supplied as the raw water and reserved in the housing 421 is forced to flow through the entrance holes 453a, the intermediate space between the inner and the outer electrodes 451 and 452, the exit holes 451a, and the outlet port 422b to be pushed out into the water outlet pipe 13 after processed into the chlorinated water. Specifically, while passing through the intermediate space between the inner and the outer electrodes 451 and 452, the raw water is electrolyzed at a power supply level corresponding to the detected temperature to produce the chlorinated water having an effective chlorine concentration ranging between 0.7 ppm and 1.1 ppm. Thus, the chlorinated water having the effective chlorine concentration of such an appropriate level is delivered to the dispensing valve 10.

In the water purifying apparatus 401 described above, an optimum electrolytic current is automatically selected with reference to the detected temperature and supplied to each of the inner and the outer electrodes 451 and 452.

Referring to FIG. 12, a water purifying apparatus according to a fifth embodiment of this invention is substantially similar in structure to the fourth embodiment illustrated in FIG. 9 except that a power supply level setting switch 508 is provided to manually select a power supply level. In the following description, similar parts are designated by like reference numerals and will not be described any longer.

The power supply level setting switch 508 has a plurality of switch patterns, only three of which are illustrated in FIG. 12. The power supply level setting switch 508 comprises six push buttons 581 which are arranged in three columns and two rows, as understood from each of the three switch patterns. The push buttons 581 are combined with LED's individually embedded on rear sides thereof so that selected ones of the push buttons 581 are lightened. The three columns of the push buttons 581 will be referred to as first, second, and third columns from left to right, respectively. A pair of upper and lower push buttons 581 in each of the first through the third columns indicate ON and OFF when pushed and lightened, respectively.

By the use of the switch patterns illustrated in FIG. 12, the description will be made as regards an operation of the power supply level setting switch 508. When the detected temperature is lower than 12° C., the push buttons 581 are selectively pushed to indicate ON, OFF, and OFF in the first through the third columns, respectively, as shown in the left switch pattern of FIG. 12. In this event, the low electrolytic current of 0.8 A is selected and supplied to each of the inner and the outer electrodes 451 and 452 (FIG. 9). When the detected temperature falls within a range between 12° C. and 28° C., the push buttons 581 are selectively pushed to indicate OFF, ON, and OFF in the first through the third columns, respectively, as shown in the middle switch pattern of FIG. 12. In this event, the standard electrolytic current of 1.2 A is selected and supplied to each of the inner and the outer electrodes 451 and 452. When the detected temperature is higher than 28° C., the push buttons 581 are selectively pushed to indicate OFF, OFF, and ON in the first through the third columns, respectively, as shown in the right switch pattern of FIG. 12. In this event, the high electrolytic current of 2 A is selected and supplied to each of the inner and the outer electrodes 451 and 452.

In other words, the power supply level setting switch 508 sets a plurality of power supply levels in connection with temperature levels of the raw water. In accordance with one of the power supply levels, the power supply control circuit 407 applies the d.c. voltage between the inner and the outer electrodes 451 and 452. The power supply level setting switch 508 will be referred to as a power setting arrangement.

In the above-mentioned water purifying apparatus according to the fifth embodiment, it is also possible to select the electrolytic current by the use of the power supply level setting switch 508 so that the chlorinated water having a desired effective chlorine concentration is obtained. Other structure and function are similar those of the fourth embodiment.

Figure 13:
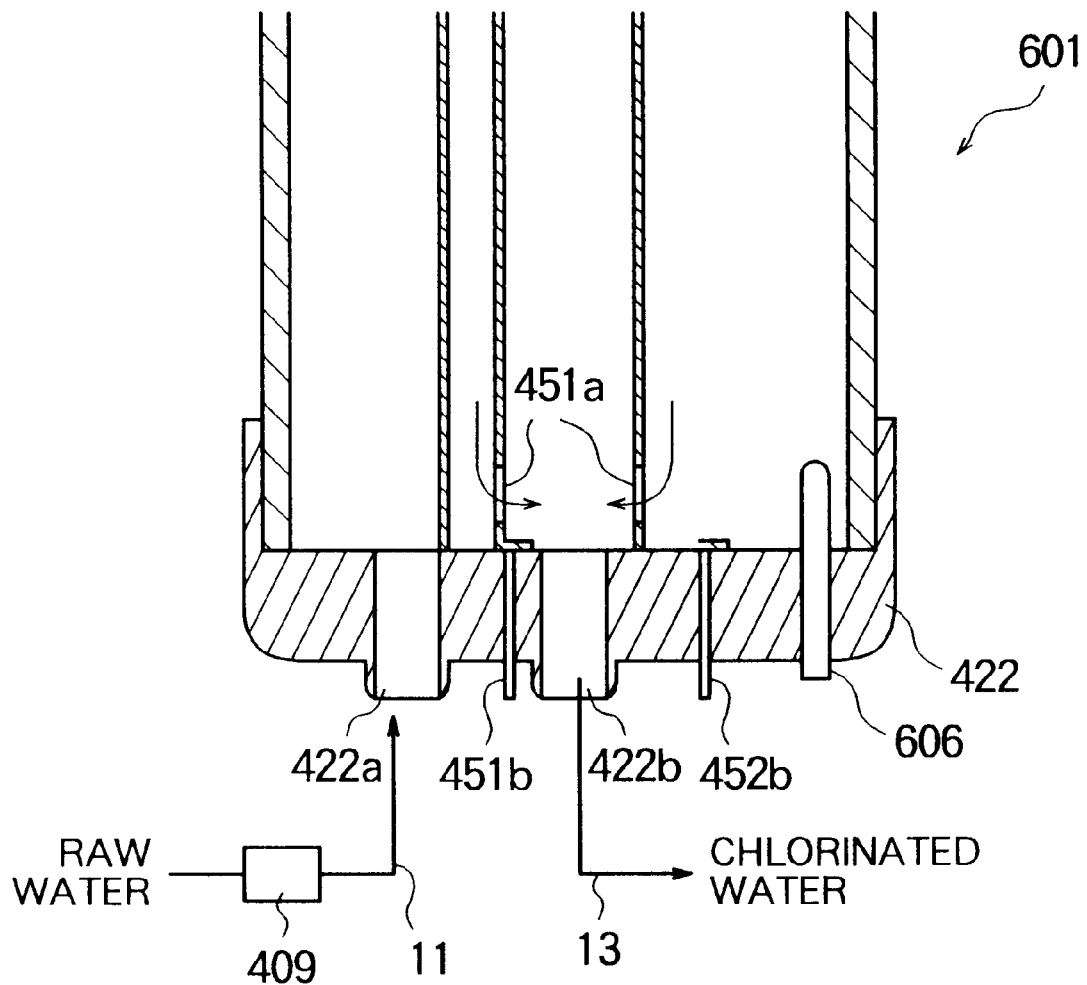
FIG. 13 is a sectional view of a characteristic part of a water purifying apparatus according to a sixth embodiment of this invention.

Referring to FIG. 13, a water purifying apparatus 601 according to a sixth embodiment of this invention is substantially similar in structure to the fourth embodiment except that the temperature sensor 406 is replaced by a conductivity sensor 606. Similar parts are designated by like reference numerals and will not be described any longer.

As illustrated in FIG. 13, the conductivity sensor 606 penetrates the cap 422. The conductivity sensor 606 is for detecting the electrical conductivity of the raw water in the water tank 402 to produce a conductivity detection signal representative of a detected conductivity. From the detected conductivity, a chlorine ion concentration (water quality) of the raw water can be calculated to produce a quality detection signal representative of the chlorine ion concentration thus calculated.

Figure 14:
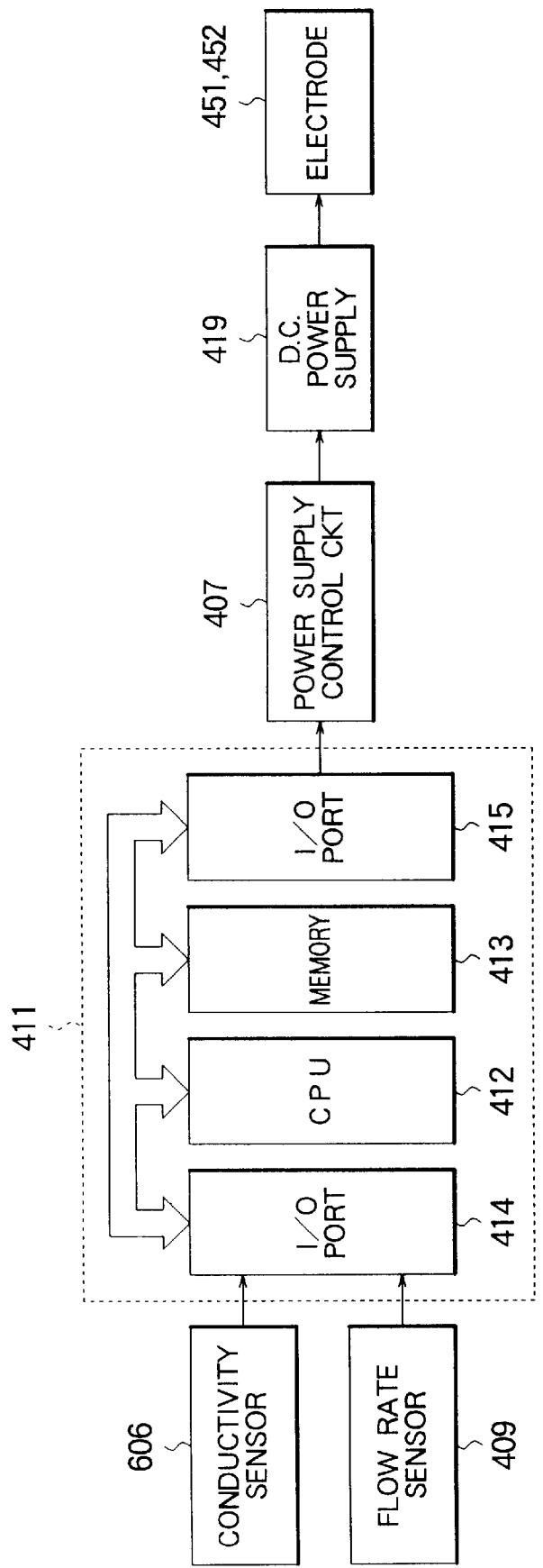
FIG. 14 is a block diagram of a control section of the water purifying apparatus illustrated in FIG. 13.

Turning to FIG. 14, a control section of the water purifying apparatus 601 is similar to that of the fourth embodiment except that the control unit 411 is responsive to the conductivity detection signal or the quality detection signal and controls the power supply control circuit 407 to determine the electrolytic current to be supplied to each of the inner and the outer electrodes 451 and 452. The power supply control circuit 407 will be referred to as a power adjusting arrangement.

Specifically, when the chlorine ion concentration of the raw water supplied to the water tank 402 falls within the range between 10 ppm and 20 ppm, the power supply control circuit 407 selects the standard electrolytic current of 1.2 A to be supplied to each of the inner and the outer electrodes 451 and 452. When the chlorine ion concentration is lower than 10 ppm, i.e., when the effective chlorine concentration is low, the high electrolytic current of 2 A is selected to promote the generation of effective chlorine. When the chlorine ion concentration is higher than 30 ppm, i.e., when the effective chlorine concentration is high, the low electrolytic current of 0.8 A is selected to suppress the generation of effective chlorine. In this manner, both the sterilizing effect and the potability are assured.

Figure 15:
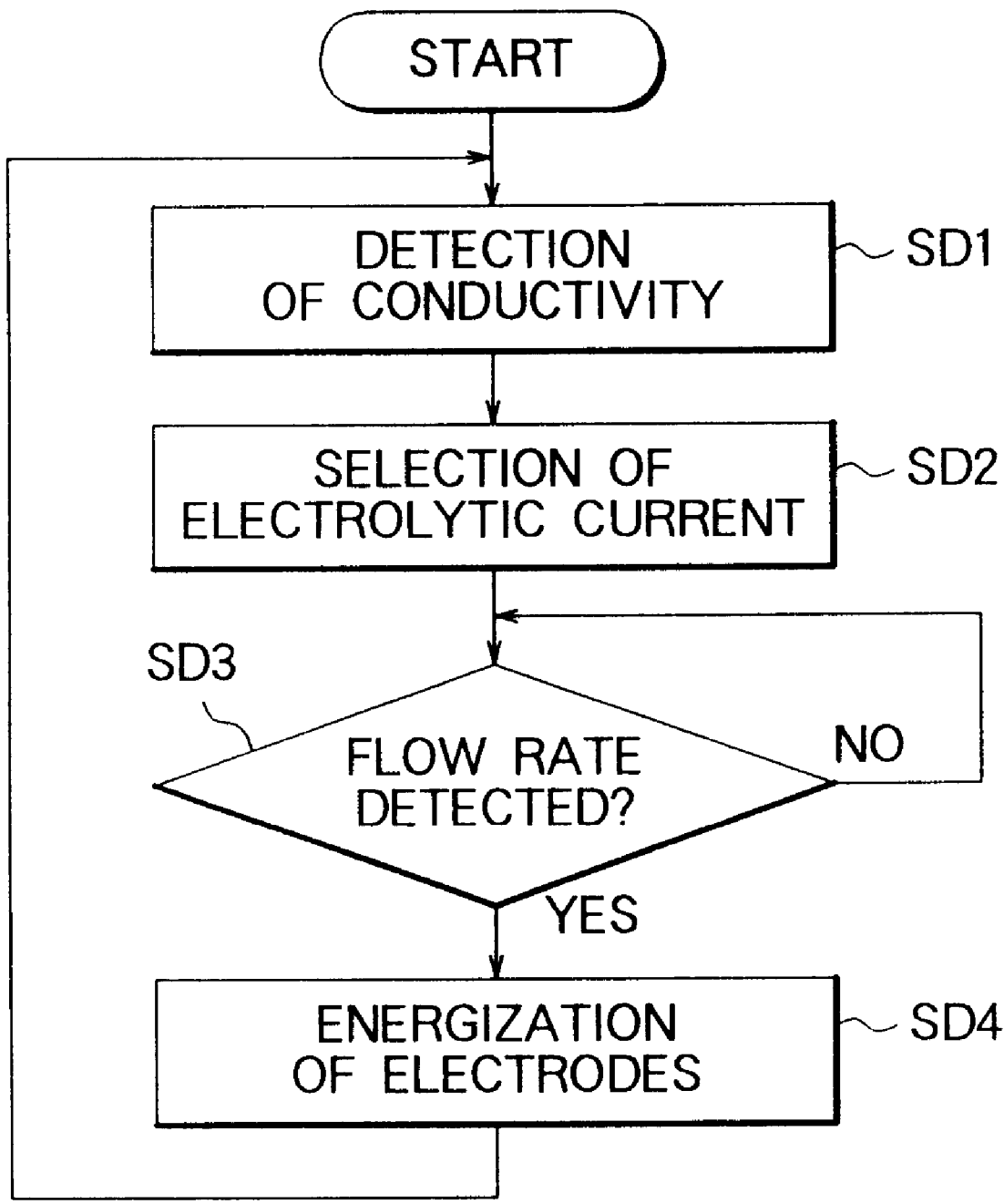
FIG. 15 is a flow chart for describing a control operation by the control section illustrated in FIG. 13.

Referring to FIG. 15, operation of the water purifying apparatus 601 of the sixth embodiment will be described. In a step SD1, the conductivity of the raw water in the water tank 402 is detected by the conductivity sensor 606 to produce the quality detection signal as described above. In a step SD2 following the step SD1, the electrolytic current is determined or selected in response to the quality detection signal. The step SD2 proceeds to a step SD3 in which judgement is made about whether or not the water flow is detected by the flow rate sensor 409. If the water flow is detected, the step SD3 proceeds to a step SD4 to supply the electrolytic current determined in the step SD2 to each of the inner and the outer electrodes 451 and 452.

As described above, an optimum electrolytic current is automatically determined in response to the quality detection signal from the conductivity sensor 606. Thus, the chlorinated water having an optimum effective chlorine concentration is supplied to the dispensing valve 10. Other structure and function are similar to those of the fourth embodiment.

Referring to FIG. 16, a water purifying apparatus according to a seventh embodiment of this invention is substantially similar in structure to the fourth embodiment illustrated in FIG. 9 except that a power supply level setting switch 708 is provided to manually select a power supply level adapted to a local area where the water purifying apparatus is used.

TABLE

| Area Code | Switch 1 | Switch 2 | Water Quality (Chlorine Ion Concentration) | Area |
|---|---|---|---|---|
| A | ON | OFF | >30 ppm | Kumamoto, Okinawa |
| B | ON | ON | 10–20 ppm | Tokyo, Osaka |
| C | OFF | ON | <10 ppm | Sapporo, Sendai, Nagoya |
| UNSET | OFF | OFF | Operation suspended | |

As seen from Table, when the water purifying apparatus is used in an area A including Kumamoto and Okinawa where the chlorine ion concentration is typically higher than 30 ppm, an area A mode is selected by the power supply level setting switch 708. An area B mode is selected by the power supply level setting switch 708 when the water purifying apparatus is used in an area B including Tokyo and Osaka where the chlorine ion concentration of the raw water typically falls within a range between 10 ppm and 20 ppm. When the water purifying apparatus is used in an area C including Sapporo, Sendai, and Nagoya where the chlorine ion concentration of the raw water is typically lower than 10ppm, an area C mode is selected by the power supply level setting switch 708.

The power supply level setting switch 708 has a plurality of switch patterns, only four of which are illustrated in FIG. 16. The power supply level setting switch 708 comprises four push buttons 781 which are arranged in two columns and two rows as understood from each of the four switch patterns. The push buttons 781 are combined with LED's individually embedded on rear sides thereof so that selected ones of the push buttons 781 are lightened. The two columns of the push buttons 781 will be referred to as first and second columns from left to right, respectively. A pair of upper and lower push buttons 781 in each of the first and the second columns indicate ON and OFF when pushed and lightened, respectively.

In order to select the area A mode shown in the left switch pattern of FIG. 16, the push buttons 781 are selectively pushed to indicate ON and OFF in the first and the second columns, respectively. In this event, the low electrolytic current of 0.8 A is selected to suppress the generation of effective chlorine. In order to select the area B mode shown in the middle-left switch pattern of FIG. 16, the push buttons 781 are selectively pushed to indicate ON in both of the first and second columns. In this event, the standard electrolytic current of 1.2 A is selected. In order to select the area C mode shown in the middle-right switch pattern of FIG. 16, the push buttons 781 are selectively pushed to indicate OFF and ON in the first and the second columns, respectively. In this event, the high electrolytic current of 2 A is selected to promote the generation of effective chlorine. When the operation of the water purifying apparatus is suspended, the push buttons 781 are selectively pushed to indicate OFF in both of the first and the second columns as an idle mode shown in the right switch pattern of FIG. 16.

In other words, the power supply level setting switch 708 sets a plurality of power supply levels in connection with conductivity levels of the raw water. In accordance with one of the power supply levels, the power supply control circuit 407 applies the d.c. voltage between the inner and the outer electrodes 451 and 452. The power supply level setting switch 708 will be referred to as a power setting arrangement.

In the water purifying apparatus of the seventh embodiment, it is possible to control the electrolytic current in response to the chlorine ion concentration of the raw water so that the chlorinated water having a desired effective chlorine concentration is obtained. Other structure and function are similar to those of the fourth embodiment.

In the fourth through the seventh embodiments, the effective chlorine concentration is controlled in response to one of the water temperature and the water quality to provide the chlorinated water excellent in both sterilization effect and potability. It will readily be understood that the control may be carried out using a combination of the water temperature and the water quality. In the sixth embodiment, the conductivity is detected by the conductivity sensor 606. However, use may be made of a chlorine ion sensor for detecting the chlorine ion concentration. Alternatively, use may be made of a resistance sensor for detecting a resistance which is a reciprocal of the conductivity.

As described above, the water temperature or the water quality of the raw water containing chlorine ions is detected to control generation of effective chlorine. Therefore, it is possible to reliably supply the chlorinated water having both the sterilizing effect and the potability irrespective of the variation in area and season.

Figure 17:
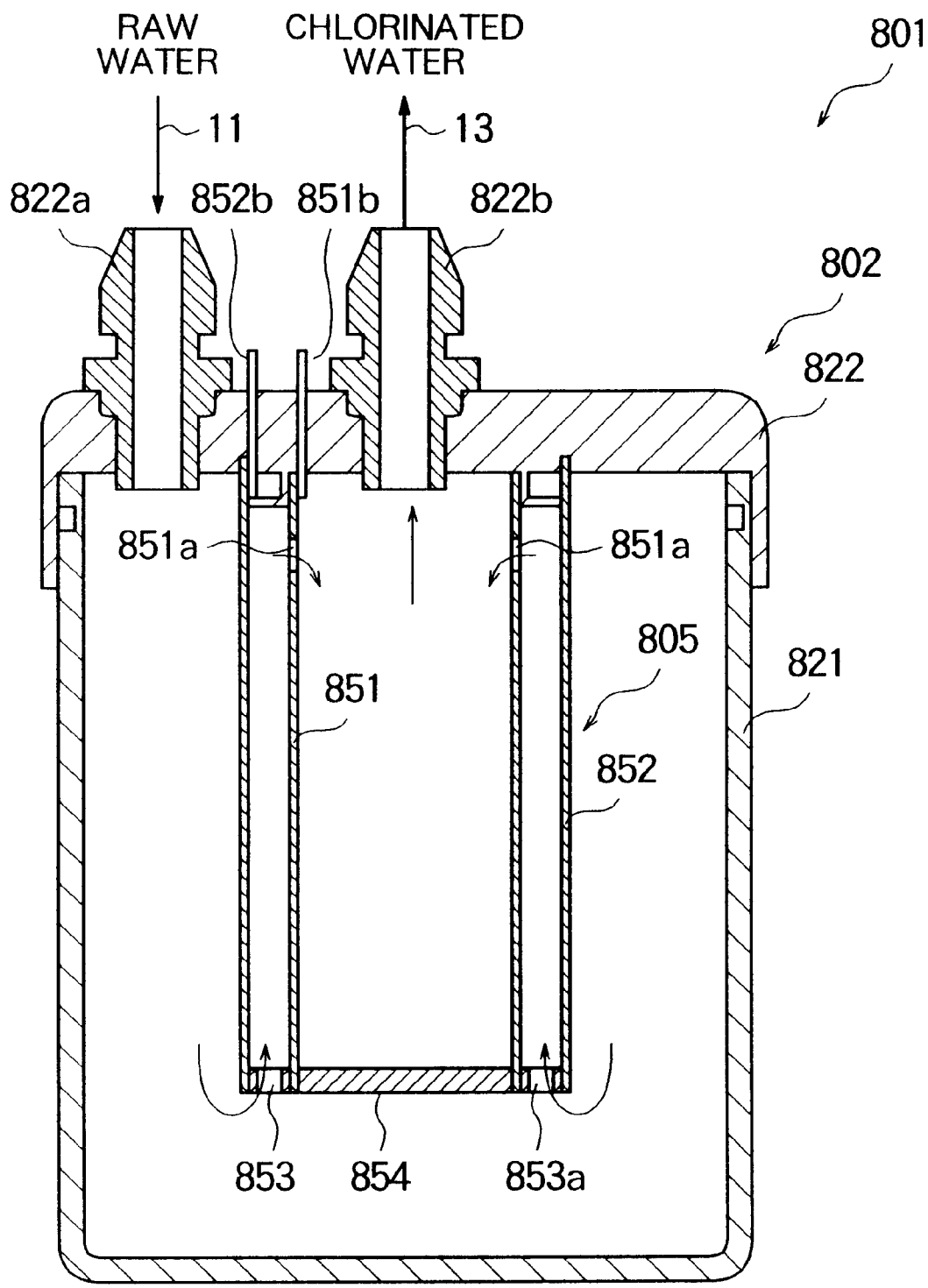
FIG. 17 is a sectional view of a water purifying apparatus according to an eighth embodiment of this invention.
Figure 18:
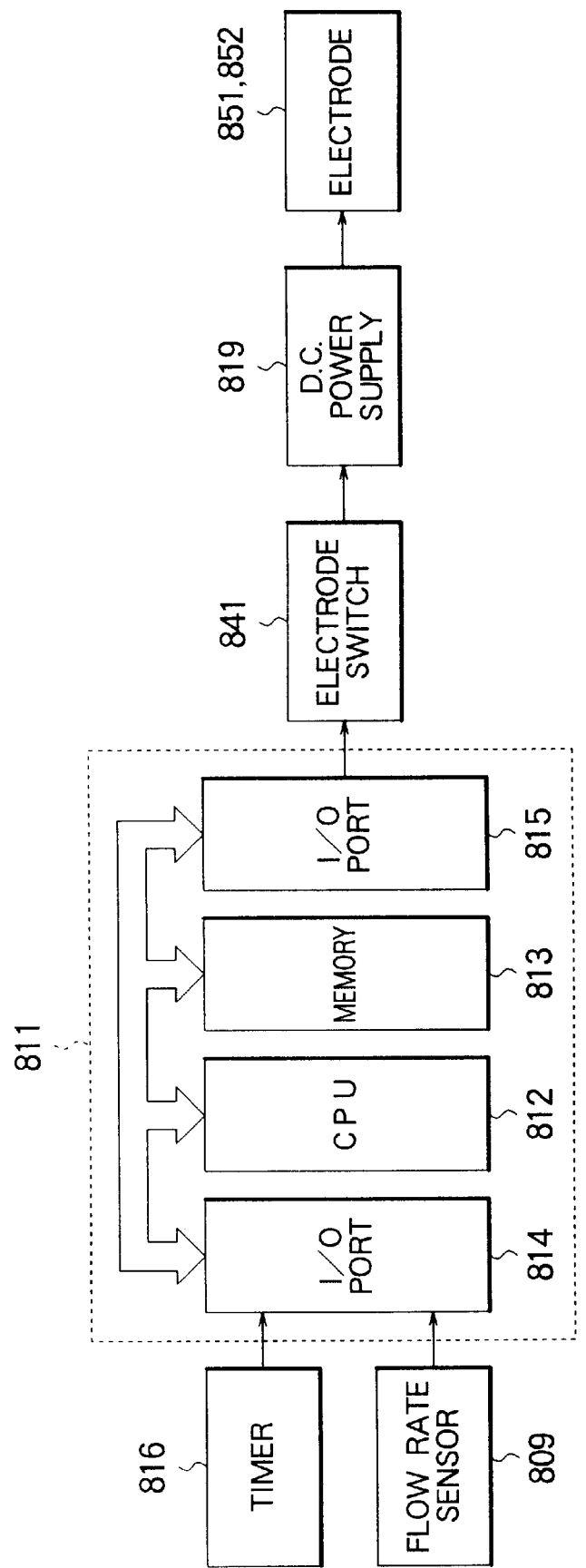
FIG. 18 is a block diagram of a control section of he water purifying apparatus illustrated in FIG. 17.
Figure 19:
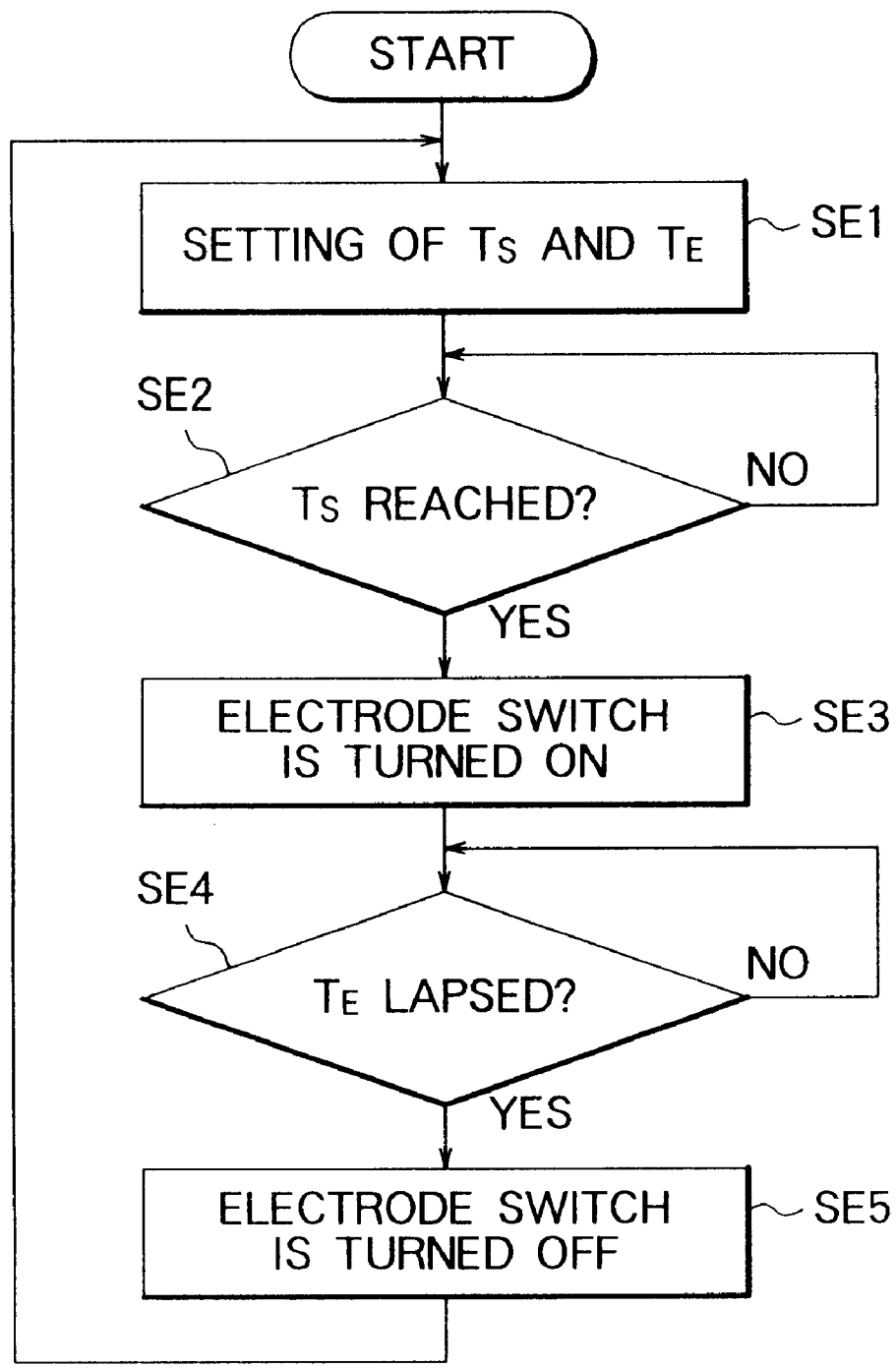
FIG. 19 is a flow chart for describing a control operation by the control section illustrated in FIG. 18.

Referring to FIGS. 17 through 19, a water purifying apparatus 801 according to an eighth embodiment of this invention will be described.

The water purifying apparatus 801 is also adapted to be equipped in the beverage dispenser described in conjunction with FIG. 1.

At first referring to FIG. 17, the water purifying apparatus 801 according to an eighth embodiment of this invention comprises a cylindrical water tank 802 of a closed structure. The water tank 802 comprises a housing 821 opened at its upper end, and a cap 822 engaged with the upper end of the housing 821 to close the housing 821. The cap 822 is provided with an inlet port 822a formed near its peripheral edge as a hollow joint to introduce the raw water from the water supply pipe 11 into the housing 821. The cap 822 is also provided with an outlet port 822b formed at its center also as a hollow joint to deliver the chlorinated water as the drinking water from the housing 821 through the water outlet pipe 13 towards the dispensing valve 10.

The cap 822 is made of an electrical insulating material such as resin. The water supply pipe 11 is provided with a flow rate detector such as a flow rate switch 809 arranged between the water supply valve 12 and the water purifying apparatus 801. When the flow rate of the raw water in the water supply pipe 11 exceeds a predetermined flow rate, i.e., when the dispensing valve 10 is opened to trigger the flow of water in the pipeline circuit, the flow rate switch 809 is turned on to produce a flow rate detection signal.

In the water tank 802 of the above-mentioned structure, an electrode unit 805 is mounted on the cap 822. The electrode unit 805 comprises a cylindrical inner electrode 851 and a cylindrical outer electrode 852 concentrically arranged around the inner electrode 851 with a predetermined gap (3 to 5 mm) kept therefrom. Each of the inner and the outer electrodes 851 and 852 comprises a titanium base material coated with platinum or a platinum alloy (including platinum—iridium). An annular fastening plate 853 is fitted to bottom ends of the inner and the outer electrodes 851 and 852 to cover an annular lower opening defined between the bottom ends of the inner and the outer electrodes 851 and 852. The fastening plate 853 serves to keep the predetermined gap between the inner and the outer electrodes 851 and 852. In addition, a circular electrode cap 854 is fitted to the bottom end of the inner electrode 851 to close a circular lower opening defined inside the bottom end of the inner electrode 851. The electrode cap 854 serves to prevent the raw water from flowing through the circular lower opening into the inside of the inner electrode 851.

The fastening plate 853 is provided with a plurality of entrance holes 853a. On the other hand, the inner electrode 851 is provided with a plurality of exit holes 851a formed at its upper portion. The raw water supplied to the water tank 802 flows from an outer space outside the outer electrode 852 through the entrance holes 853a into an intermediate space between the inner and the outer electrodes 851 and 852. After the raw water is processed within the intermediate space into the chlorinated water, the chlorinated water flows through the exit holes 851a into an inner space inside the inner electrode 851. Thus, a combination of the entrance holes 853a, the intermediate space between the inner and the outer electrodes 851 and 852, and the exit holes 851a forms a water channel between the outer space outside the outer electrode 852 and the inner space inside the inner electrode 851. The inner and the outer electrodes 851 and 852 have electrode terminals 851b and 852b attached to their upper ends, respectively. The electrode terminals 851b and 852b penetrate the cap 822 in a sealed condition to be connected to a d.c. power supply.

Next referring to FIG. 18, a control section of the water purifying apparatus 801 of the eighth embodiment will be described. The water purifying apparatus 801 comprises a control unit 811 implemented by a microcomputer and is automatically operated. The control unit 811 comprises a central processing unit (CPU) 812 and a memory 813 storing a control program. The control unit 811 has I/O ports 814 and 815. The I/O port 814 is for input of a signal from a timer 816 and a flow rate sensor 809 and for output of a signal through an electrode switch 841 and a d.c. power supply 819 to each of the inner and the outer electrodes 851 and 852.

The timer 816 is for monitoring an energization start time instant and an energizing period for each of the first and the second electrodes 851 and 852. The energization start time instant is selected within an idle time zone during which the beverage dispenser suspends the water supply because no vending operation is performed, i.e., a midnight zone after lapse of several hours from a closing hour of a shop where the beverage dispenser is installed. The energizing period is selected so that the effective chlorine concentration is increased by about 20% to become substantially equal to a desired concentration.

Referring to FIG. 19, operation of the water purifying apparatus 801 according to the eighth embodiment will be described. In a step SE1, the energization start time instant $T_S$ and the energizing period $T_E$ is set by the timer 816. In a step SE2 following the step SE1, judgement is made about whether or not the energization start time instant $T_S$ is reached. When the energization start time instant $T_S$ is reached, the step SE2 proceeds to a step SE3 in which the electrode switch 841 is turned on to apply an electric voltage, namely, a d.c. voltage to each of the inner and the outer electrodes 851 and 852. In a step SE4 following the step SE3, judgement is made about whether or not the energizing period $T_E$ has lapsed. If the energizing period $T_E$ has lapsed, the step SE4 proceeds to a step SE5 to turn off the electrode switch 841. Thus, the reserved water reserved in the water tank 802 and containing chlorine ions is electrolyzed to compensate the decrease in effective chlorine concentration resulting from continuous suspension of the water supply. In this embodiment, a single time instant is set as the energization start time instant $T_S$. However, a plurality of time instants may be set to prevent variation in effective chlorine concentration within the water tank 802.

Figure 20:
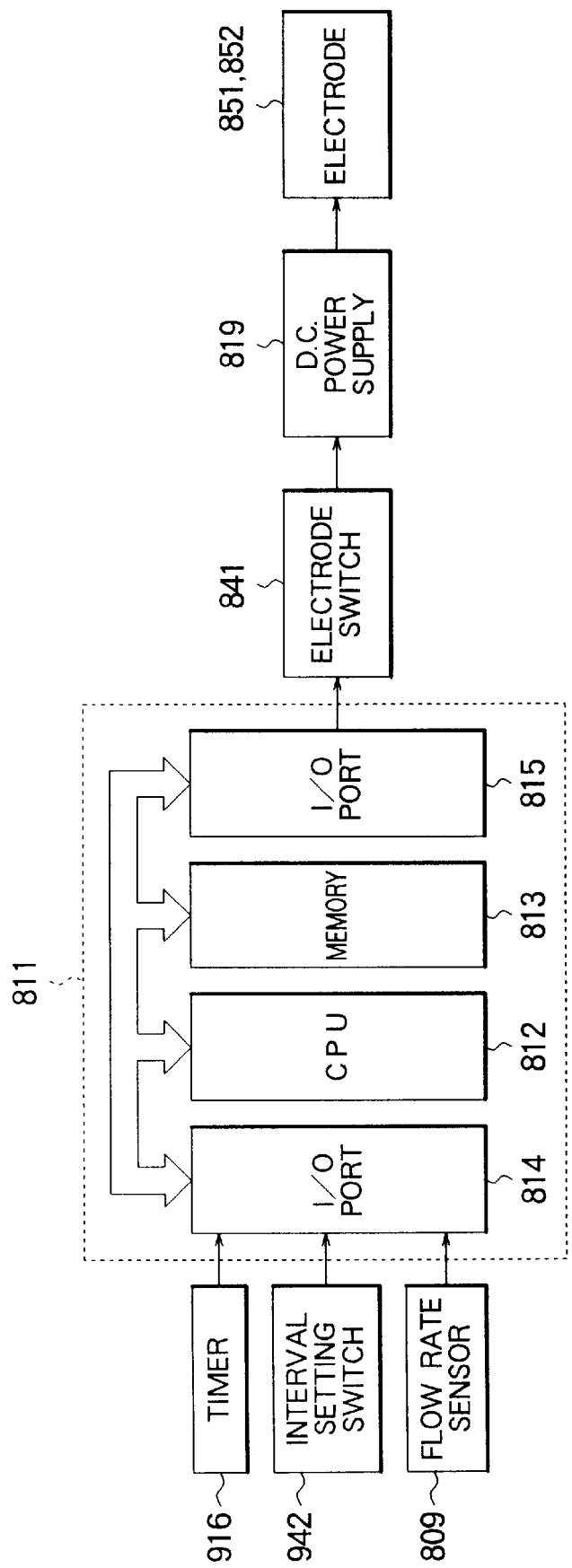
FIG. 20 is a block diagram of a control section of a water purifying apparatus according to a ninth embodiment of this invention.
Figure 21:
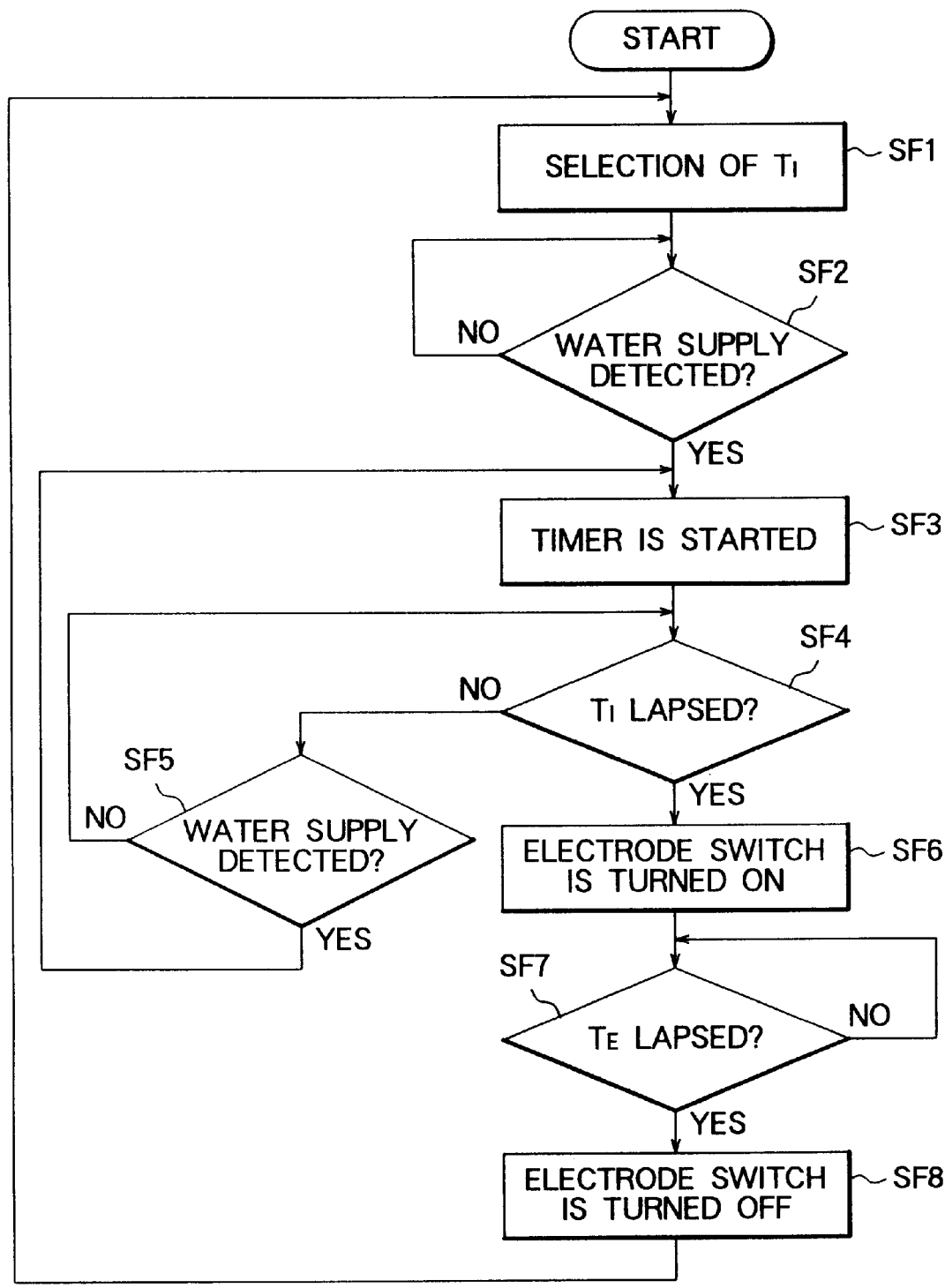
FIG. 21 is a flow chart for describing a control operation by the control section illustrated in FIG. 20.

Referring to FIGS. 20 and 21, a water purifying apparatus according to a ninth embodiment of this invention is substantially similar in structure to the water purifying apparatus 801 of the eighth embodiment except that an interval setting switch 942 is provided. Similar parts are designated by like reference numerals and will not be described any longer.

The interval setting switch 942 is for setting first and second time intervals $T_{f1}$ and $T_{f2}$ which are monitored by a timer 916. The timer 916 also monitors an energizing period $T_E$ from the start to the end of the energization of each of the inner and the outer electrodes 851 and 852, in the manner similar to the eighth embodiment.

Each of the first and the second time intervals $T_{f1}$ and $T_{f2}$ is a time duration from the start of supply of the raw water to the water tank 802, i.e., the detection of the water flow by the flow rate sensor 809 to the start of energization of each of the inner and the outer electrodes 851 and 852. For example, the first time interval $T_{f1}$ is equal to 3 hours to meet a season when the water temperature is not so high. On the other hand, the second time interval $T_{f2}$ is equal to 2 hours to meet another season when the water temperature becomes very high, i.e. the summer season. One of the first and the second time intervals $T_{f1}$ and $T_{f2}$ is selected as a selected time interval $T_f$. In this event, the flow rate sensor 809 will be referred to as a water supply sensor.

In response to the flow rate detection signal from the flow rate sensor 809 and by monitoring the selected time interval $T_f$, the electrode switch 841 is turned on for the energizing period $T_E$. More particularly, operation of the electrode switch 841 is controlled to apply the d.c. voltage between the inner and the outer electrodes 85 and 852.

Referring to FIG. 21, operation of the water purifying apparatus of the ninth embodiment will be described. In the manner similar to the eighth embodiment, the energizing period $T_E$ is selected so that the effective chlorine concentration of the water reserved in the water tank 802 is increased by about 20% when each of the inner and the outer electrodes 851 and 852 is energized.

In a step SF1, one of the first and the second time intervals $T_{f1}$ and $T_{f2}$ is selected as the selected time interval $T_f$. Specifically, in case where the vending operation is performed in the summer season, the second time interval $T_{f2}$ shorter than the first time interval $T_{f1}$ is selected. Otherwise, the first time interval time $T_{f1}$ is selected. In a step SF2 following the step SF1, judgement is made about whether or not the vending operation is performed and the water supply is started, i.e., whether or not the water flow is detected by the flow rate sensor 809. If the water supply is started, the step SF2 proceeds to a step SF3 to start monitoring of the lapse of the selected time interval $T_f$. The step SF3 is followed by a step SF4 in which judgement is made about whether or not the selected time interval $T_f$ has lapsed. If not, the step SF4 proceeds to a step SF5 to judge whether or not the water supply is detected again. If the water supply is detected again, the step SF5 returns to the step SF3 to reset the timer 916 and restart the monitoring. On carrying out the step SF3, the control unit 811 will be referred to as a resetting arrangement.

Otherwise, the step SF5 returns to the step SF4 to continue the monitoring. When the selected time interval $T_f$ has lapsed without interrupting the suspension of the water supply, the step SF4 proceeds to a step SF6 to turn on the electrode switch 841. The step SF6 is followed by a step SF7 in which the lapse of the energizing period $T_E$ is monitored. During the energizing period $T_E$, the effective chlorine concentration of the reserved water in the water tank 802 is increased by the electrolysis. If the energizing period $T_E$ has lapsed, the step SF7 proceeds to a step SF8 to turn off the electrode switch 841.

As described above, the time interval before energization of the inner and the outer electrodes 851 and 852 is monitored from the start of supply of the raw water. Therefore, in case where the vending operation is frequently carried out and the raw water is substantially continuously supplied to the water tank 802, i.e., in case where the effective chlorine concentration within the water tank 802 is not so lowered, the inner and the outer electrodes 851 and 852 are not energized. On the other hand, energization is performed only when the standby period lasts for a long time so that the effective chlorine concentration will be decreased by 20% or more. Thus, the effective chlorine concentration of the reserved water in the water tank 802 is efficiently maintained at a predetermined level.

In the water purifying apparatus of this embodiment, the selected time interval as an energization waiting time is selected from the first and the second time intervals $T_{f1}$ and $T_{f2}$, long and short. The second or shorter time interval $T_{f2}$ is selected during the season in which the water temperature in the water tank 802 is high so that natural decomposition of chlorine is accelerated, i.e., during the summer season. On the other hand, the first or longer time interval $T_{f1}$ is selected in other seasons. It is therefore possible to meet the variation in effective chlorine concentration in dependence upon the change in water temperature. Thus, the effective chlorine concentration in the water tank 802 can be maintained at a level not lower than the predetermined level.

Figure 22:
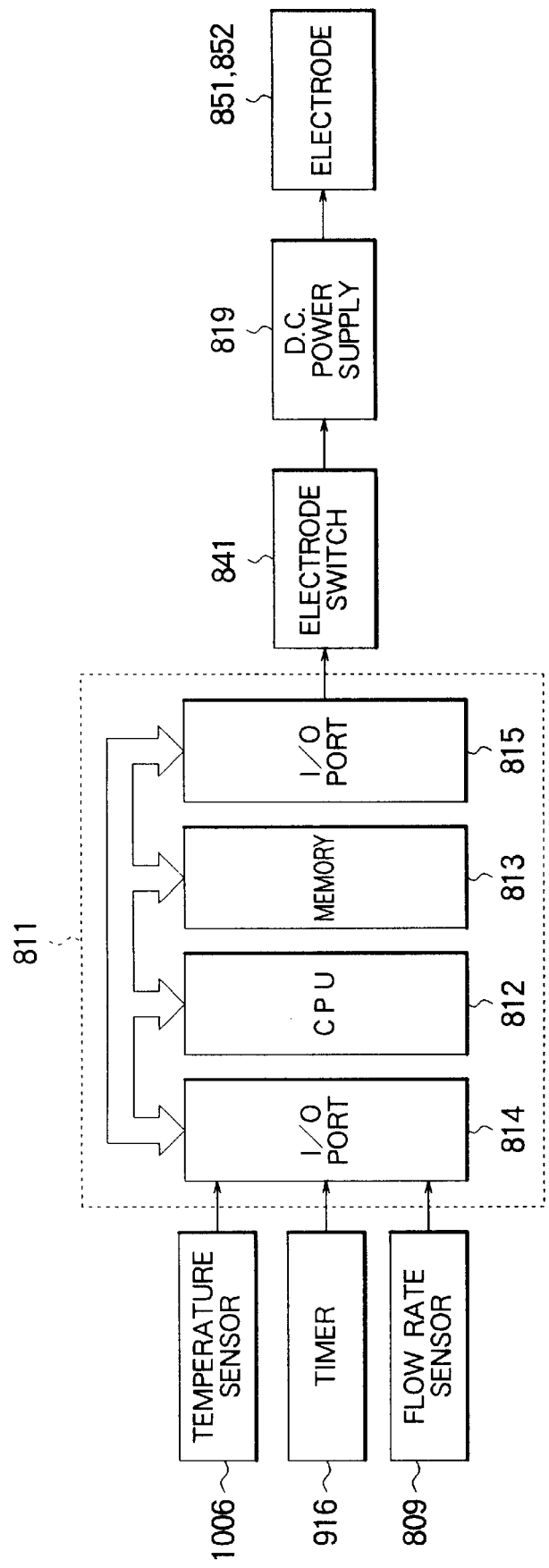
FIG. 22 is a block diagram of a control section of a water purifying apparatus according to a tenth embodiment of this invention.

Referring to FIG. 22, a water purifying apparatus according to a tenth embodiment of this invention is substantially similar in structure to the ninth embodiment except that the interval setting switch 942 is replaced by a temperature sensor 1006. The temperature sensor 1006 is for detecting the water temperature in the water tank 802 as a detected temperature. With reference to the detected temperature, a preselected time interval $T_f$ from the start of the water supply to the start of application of the electric voltage is determined. When the detected temperature is high and low, the preselected time interval $T_f$ is short and long, respectively. The energizing period $T_E$ of the inner and the outer electrodes 851 and 852 is also determined with reference to the detected temperature. Specifically, the energizing period $T_E$ is short and long when the detected temperature is high and low, respectively. Practically, the preselected time interval $T_f$ and the energizing period $T_E$ are determined by the use of a function in which a difference between a reference temperature and the detected temperature used as a variable, or by the use of data preliminarily prepared in correspondence to various temperature levels.

Figure 23:
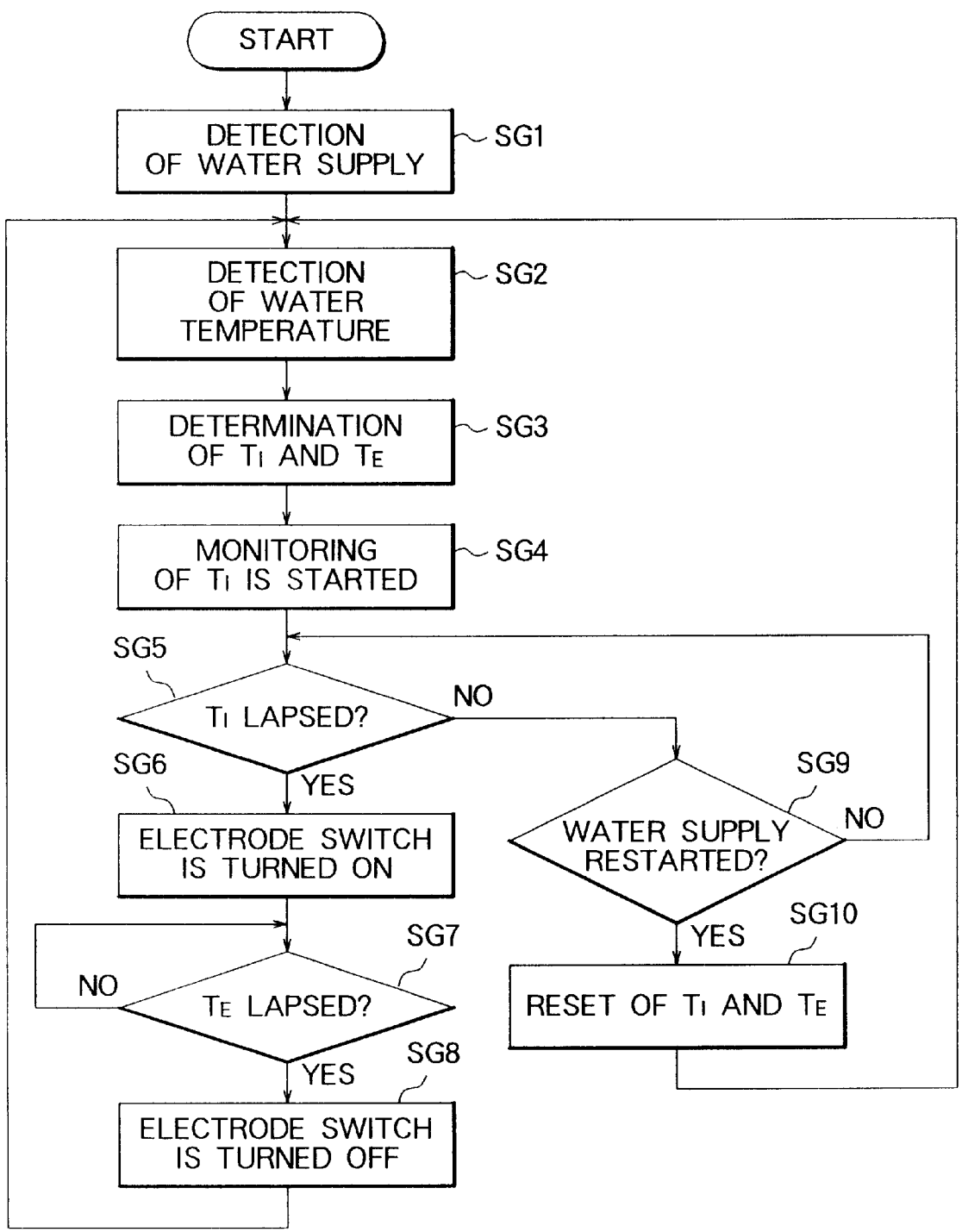
FIG. 23 is a flow chart for describing a control operation by the control section illustrated in FIG. 22.

Referring to FIG. 23, control operation of the water purifying apparatus in the tenth embodiment will be described.

In a step SG1, a start of the water supply is detected. The step SG1 proceeds to a step SG2 in which the water temperature is detected as the detected temperature. The step SG2 is followed by a step SG3 to determine or correct the preselected time interval $T_f$ and the energizing period $T_E$. In a step SG4 following the step SG3, the timer 916 is started to monitor the preselected time interval $T_f$. The step SG4 proceeds to a step SG5 in which judgement is made about whether or not the preselected time interval $T_f$ has lapsed.

When the preselected time interval $T_I$ has lapsed, the step SG5 proceeds to a step SG6 to turn on the electrode switch 841. The step SG6 is followed by a step SG7 in which judgement is made about whether or not the energizing period $T_E$ has lapsed. If the energizing period $T_E$ has lapsed, the step SG7 proceeds to a step SG8 to turn off the electrode switch 841.

On the other hand, if the preselected time interval $T_I$ has not lapsed, the step SG5 proceeds to a step SG9 at which judgement is made about whether or not the water supply is restarted. Only when the water supply is restarted, the step SG9 proceeds to a step SG10 at which the preselected time interval $T_I$ and the energizing period $T_E$ are reset. The step SG10 returns to the step SG2.

When the water supply is started, the water pump 14 is operated so that the raw water flows from the water supply pipe 11 through the water supply valve 12 and the inlet port 822a into the water tank 802, as depicted by arrows in FIG. 17. Then, the reserved water in the water tank 802 is forced to flow through the entrance holes 853a, the intermediate space between the inner and the outer electrodes 851 and 852, the exit holes 851a, and the outlet port 822b to be pushed out into the water outlet pipe 13 after processed into the chlorinated water. The chlorinated water is delivered to the dispensing valve 10, as depicted by arrows in FIG. 17.

In this embodiment, the energizing period $T_E$ during the water supply to the dispensing valve 10 and the preselected interval time $T_I$ during the suspension of the water supply are determined with reference to the detected temperature. Thus, an appropriate energizing period corresponding to the detected temperature is selected so as to maintain the effective chlorine concentration at an appropriate level.

As described above, it is possible to prevent the decrease of effective chlorine concentration of the reserved water reserved in the water tank of a closed type and to assure a desired effective chlorine concentration by controlling energization in correspondence to the water temperature.

Figure 24:
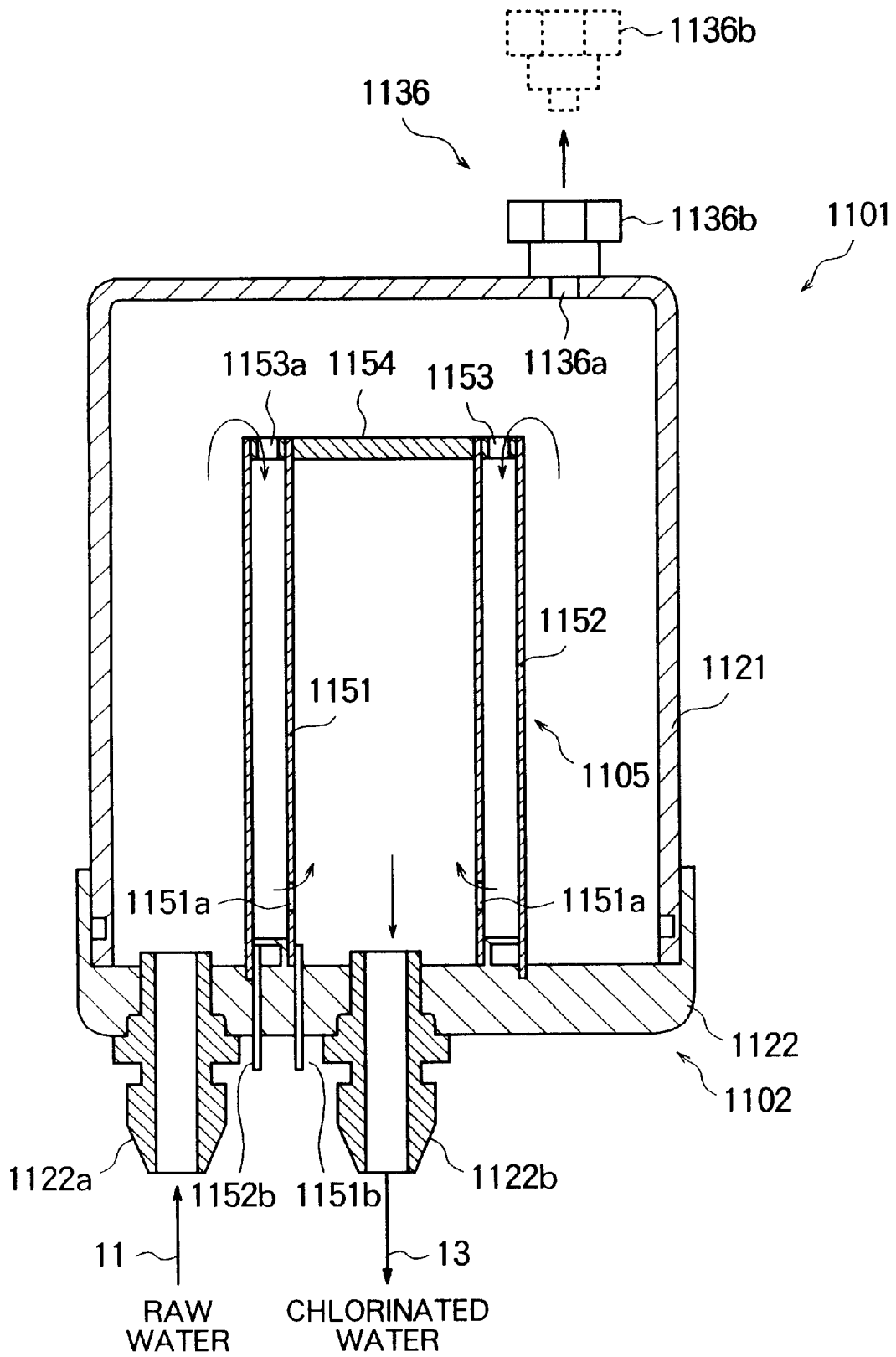
FIG. 24 is a sectional view of a water purifying apparatus according to an eleventh embodiment of this invention.

Referring to FIG. 24, the water purifying apparatus 1101 according to an eleventh embodiment of this invention comprises a cylindrical water tank 1102 of a closed structure. The water tank 1102 comprises a housing 1121 opened at its lower end, and a cap 1122 engaged with the lower end of the housing 1121 to close the housing 1121. The cap 1122 is provided with an inlet port 1122a formed near its peripheral edge as a hollow joint to introduce the raw water from the water supply pipe 11 into the housing 1121. The cap 1122 is also provided with an outlet port 1122b formed at its center also as a hollow joint to deliver the chlorinated water as the drinking water from the housing 1121 through the water outlet pipe 13 towards the dispensing valve 10.

The cap 1122 is made of an electrical insulating material such as resin. The water supply pipe 11 is provided with a flow rate detector such as a flow rate switch 1109 arranged between the water supply valve 12 and the water purifying apparatus 1101. When the flow rate of the raw water in the water supply pipe 11 exceeds a predetermined flow rate, i.e., when the dispensing valve 10 is opened to trigger the flow of water in the pipeline circuit, the flow rate switch 1109 is turned on to produce a flow rate detection signal.

In the water tank 1102 of the above-mentioned structure, an electrode unit 1105 is mounted on the cap 1122. The electrode unit 1105 comprises a cylindrical inner electrode 1151 and a cylindrical outer electrode 1152 concentrically arranged around the inner electrode 1151 with a predetermined gap (3 to 5 mm) kept therefrom. Each of the inner and the outer electrodes 1151 and 1152 comprises a titanium base material coated with platinum or a platinum alloy (including platinum-iridium). An annular fastening plate 1153 is fitted to top ends of the inner and the outer electrodes 1151 and 1152 to cover an annular upper opening defined between the top ends of the inner and the outer electrodes 1151 and 1152. The fastening plate 1153 serves to keep the predetermined gap between the inner and the outer electrodes 1151 and 1152.

In addition, a circular electrode cap 1154 is fitted to the top end of the inner electrode 1151 to close a circular upper opening defined inside the top end of the inner electrode 1151. The electrode cap 1154 serves to prevent the raw water from flowing through the circular upper opening into the inside of the inner electrode 1151.

The fastening plate 1153 is provided with a plurality of entrance holes 1153a. On the other hand, the inner electrode 1151 is provided with a plurality of exit holes 1151a formed at its lower portion. The raw water supplied to the water tank 1102 flows from an outer space outside the outer electrode 1152 through the entrance holes 1153a into an intermediate space between the inner and the outer electrodes 1151 and 1152. After the raw water is processed within the intermediate space into the chlorinated water, the chlorinated water flows through the exit holes 1151a into an inner space inside the inner electrode 1151. Thus, a combination of the entrance holes 1153a, the intermediate space between the inner and the outer electrodes 1151 and 1152, and the exit holes 1151a forms a water channel between the outer space outside the outer electrode 1152 and the inner space inside the inner electrode 1151. The inner and the outer electrodes 1151 and 1152 have electrode terminals 1151b and 1152b attached to their lower ends, respectively. The electrode terminals 1151b and 1152b penetrate the cap 1122 in a sealed condition to be connected to a d.c. power supply.

For example, the inner and the outer electrodes 1151 and 1152 are controllably applied with a d.c. voltage in the following manner. When the flow rate switch 1109 detects the flow rate not smaller than a predetermined flow rate, i.e. when the raw water is supplied, the d.c. voltage is continuously applied. During suspension of the water supply, the d.c. voltage is applied at a predetermined interval monitored by a timer. Thus, an appropriate amount of chlorine can be added when a vending operation is consecutively repeated. On the other hand, when the suspension of the water supply lasts for a long time to result in reduction in amount of effective chlorine, the reduction can be compensated.

As seen from FIG. 24, the housing 1121 of the water tank 1102 is provided at its top with a gas discharge port 1136a and a plug 1136b for closing the gas discharge port 1136a. When the plug 1136b is removed from the gas discharge port 1136a, gases within the water tank 1102 is discharged. A combination of the gas discharge port 1136a and the plug 1136b forms a gas discharge arrangement 1136 which is for discharging resultant gases, produced from the raw water as a result of the electrolysis, from the water tank 1102.

When the dispensing valve 10 is opened, the flow rate switch 1109 detects the flow rate not smaller than the predetermined flow rate to produce a flow rate detection signal. In response to the flow rate detection signal, the water supply valve 12 is opened and the inner and the outer electrodes 1151 and 1152 are applied with the d.c. voltage.

In addition, the water pump 14 is activated. As a consequence, the raw water is supplied from the water supply pipe 11 through the inlet port 1122a into the housing 1121 so that reserved water already supplied as the raw water and reserved in the housing 1121 is forced to flow through the entrance holes 1153a, the intermediate space between the inner and the outer electrodes 1151 and 1152, the exit holes 1151a, and the outlet port 1122b to be pushed out into the water outlet pipe 13 after processed into the chlorinated water. Specifically, while passing through the intermediate space between the inner and the outer electrodes 1151 and 1152, the raw water is electrolyzed to produce the chlorinated water containing chlorine. The chlorinated water has an effective chlorine concentration ranging between 0.7 ppm and 1.1 ppm and is delivered to the dispensing valve 10.

As described above, chlorine is generated by the electrolysis of the raw water. Simultaneously, a hydrogen gas is generated around one of the inner and the outer electrodes 1151 and 1152 which acts as a cathode while an oxygen gas is generated around the other electrode acting as an anode. These gases are attracted to the inner and the outer electrodes 1151 and 1152 or drifted between the inner and the outer electrodes 1151 and 1152. Sometimes, the gases float up to be accumulated in an upper portion within the water tank 1102 to be mixed into the processed water and supplied to the cup D during the vending operation.

When the vending operation is consecutively repeated, i.e., performed at a short time interval, no serious problem will arise because the amount of the gases mixed into the water per unit water volume is small. When a standby period before a next vending operation is long, however, a great amount of the gases are generated during such a long time period to degrade the efficiency of the electrolysis. In addition, at the next vending operation performed first after the standby period, such a great amount of the gases may be mixed into the water to considerably reduce an amount of the beverage actually supplied to the cup D.

In view of the above, the plug 1136b is removed from the gas discharge port 1136a when the standby period lasts for a long time. It is therefore possible to discharge the gases accumulated in the water tank 1102 through the gas discharge port 1136a.

Figure 25:
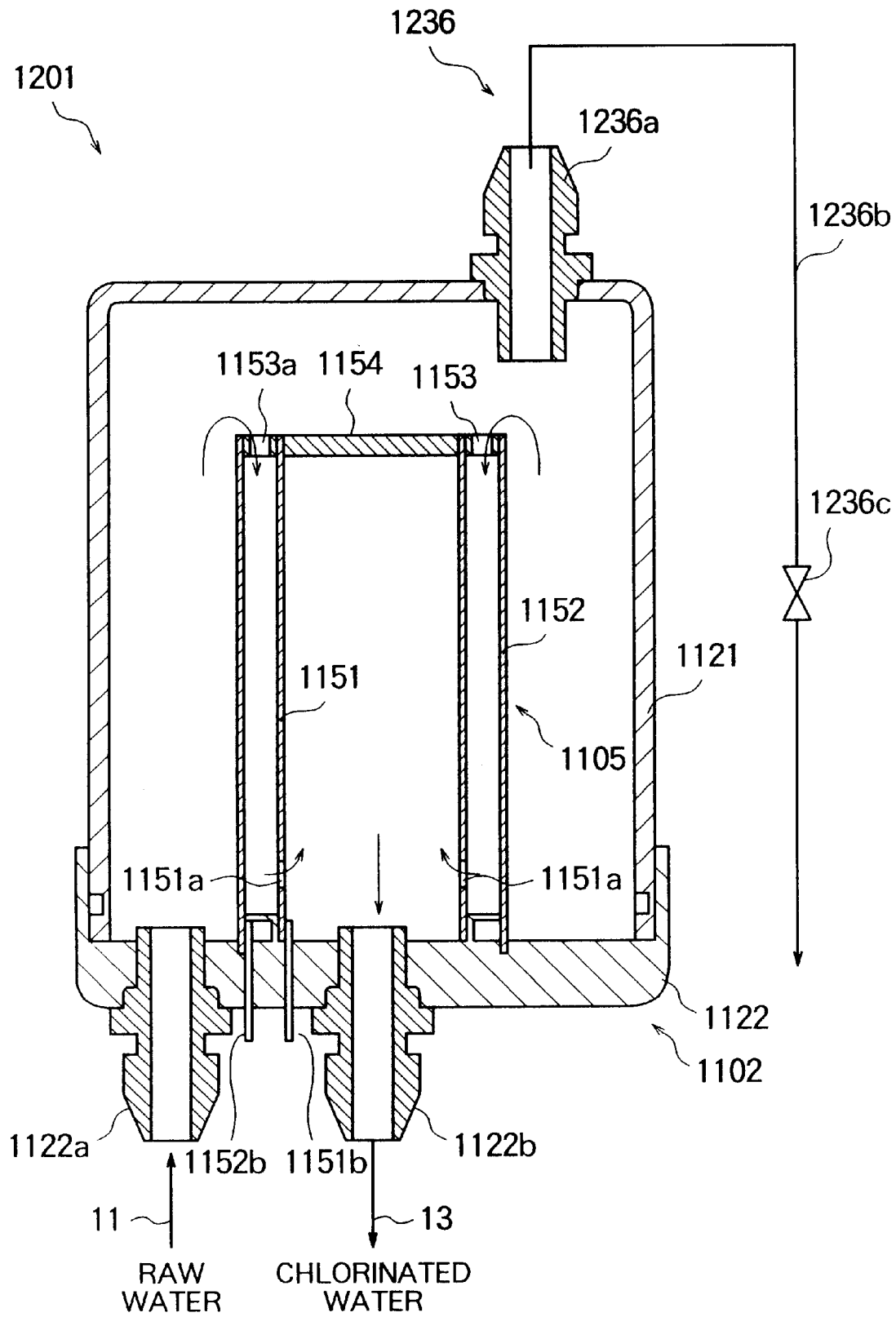
FIG. 25 is a sectional view of a water purifying apparatus according to a twelfth embodiment of this invention.

Referring to FIG. 25, a water purifying apparatus 1201 according to a twelfth embodiment of this invention is similar in structure to the eleventh embodiment except that the gas discharge arrangement 1136 is replaced by a gas discharge arrangement 1236. Similar parts are designated by like reference numerals and will not be described any longer.

Specifically, the gas discharge arrangement 1236 comprises a gas discharge port 1236a in the form of a hollow joint and a gas discharge pipe 1236b connected to the gas discharge port 1236a and opened to air. The gas discharge pipe 1236b is provided with a gas discharge valve 1236c.

In the twelfth embodiment, the gases accumulated in the water tank 1102 can be discharged by opening the gas discharge valve 1236c. In order to efficiently discharge the gases, the discharge operation can be controlled in a manner such that the gas discharge valve 1236c is opened when the d.c. voltage is applied to each of the inner and the outer electrodes 1151 and 1152. Other structure and function are similar to those of the eleventh embodiment.

Figure 26:
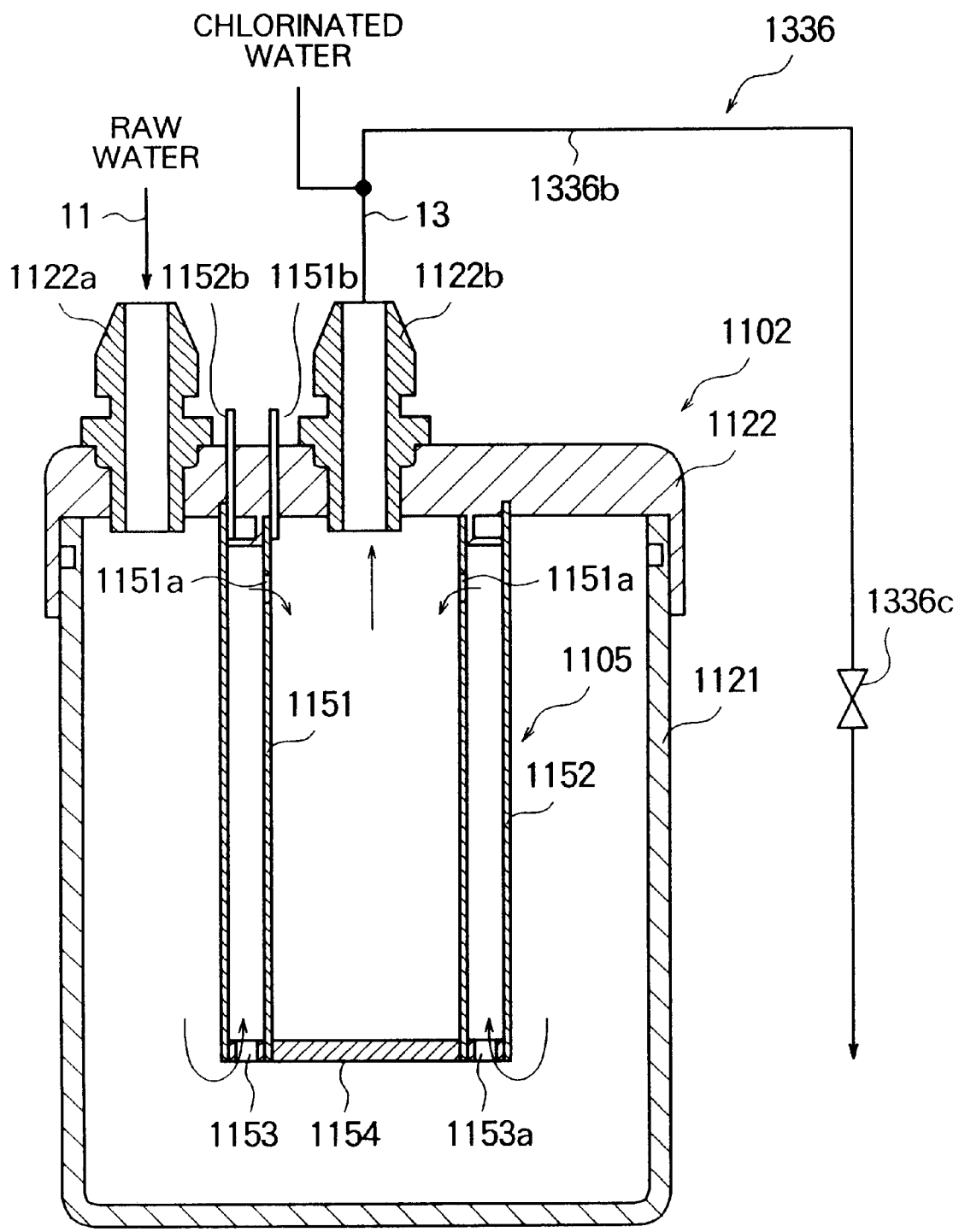
FIG. 26 is a sectional view of a water purifying apparatus according to a thirteenth embodiment of this invention.

Referring to FIG. 26, a water purifying apparatus 1301 according to a thirteenth embodiment of this invention is similar in structure to that of the twelfth embodiment except the following. Similar parts are designated by like reference numerals and will not be described any longer. Specifically, the water purifying apparatus 1301 in this embodiment is reversed in vertical position as compared with the water purifying apparatus 1201 in the twelfth embodiment. In addition, a gas discharge arrangement 1336 comprises a combination of the water outlet port 1122b, a gas discharge pipe 1336b, and a gas discharge valve 1336c. The gas discharge pipe 1336b has an end connected to the water outlet pipe 13 between the water outlet port 1122b and the water pump 14 and has another end opened. The gas discharge valve 1336c is connected to the gas discharge pipe 1336b.

According to the thirteenth embodiment, the water outlet port 1122b also serves as a gas discharge port. Other structure and operation are similar to those of the twelfth embodiment.

Figure 27:
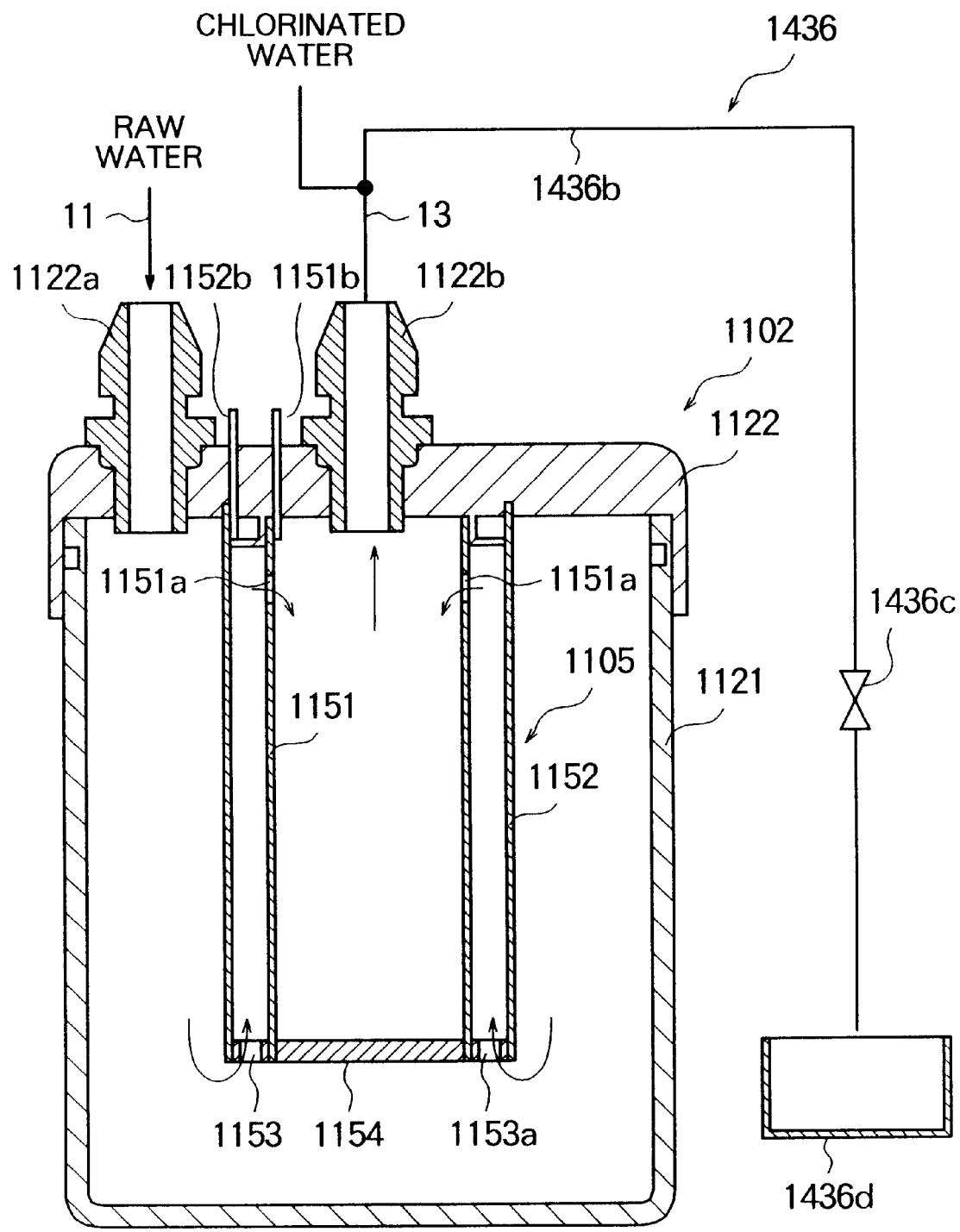
FIG. 27 is a sectional view of a water purifying apparatus according to a fourteenth embodiment of this invention.

Referring to FIG. 27, a water purifying apparatus 1401 according to a fourteenth embodiment of this invention is substantially similar in structure to the thirteenth embodiment except that a gas discharge arrangement 1436 comprises a gas discharge pipe 1436b, a gas discharge valve 1436c, and a water sump 1436d connected to a terminal end of the gas discharge pipe 1436b and opened to air. Similar parts are designated by like reference numerals and will not be described any longer.

According to the fourteenth embodiment, a part of the chlorinated water which may be discharged through the gas discharge pipe 1436b as leaked water can be received by the water sump 1436d and can easily be drained. Other structure and operation are similar to those of the thirteenth embodiment.

As described above, the oxygen gas and the hydrogen gas generated by the electrolysis are discharged by the gas discharge arrangement so that the efficiency of the electrolysis and thus the efficiency in generation of chlorine are prevented from being degraded. Since the gases are not accumulated in the water tank as described above, it is possible to avoid the mixture of a large amount of gases into the drinking water supplied to the dispensing valve. Thus, during the vending operation, it is assured that a predetermined amount of the beverage is supplied to the cup.

In each of the foregoing embodiments, description has been made in conjunction with the water purifying apparatus of a closed type comprising the inner and the outer electrodes concentrically arranged. However, it will be understood that this invention is also applicable to any other water purifying apparatus of a closed type. The water purifying apparatus is applicable not only to the beverage dispenser but also to a domestic water purification unit or a sterilizer for sterilizing medical instruments.

What is claimed is:

1. An apparatus for purifying raw water to provide purified water, said raw water containing chlorine ions, said apparatus comprising:

a water tank for storing said raw water an inlet port connecting said water tank for supplying said raw water into said water tank;

an outlet port connected to said water tank for discharging said purified water from said water tank;

a cylindrical inner electrode placed in said water tank;

a cylindrical outer electrode placed in said water tank to surround said inner electrode with a predetermined gap left therebetween, defining an elongate water channel through which said raw water flows;

said water channel extending from said water tank to said outlet port and including a first end portion having an inlet and an opposite end portion having an outlet such that the raw water flows through said inlet at said first end portion, along said water channel, and is discharged through said outlet at said opposite end portion; an outer chamber exterior to said outer electrode and within said water tank; closing means for closing an inner space surrounded by said inner electrode defining an inner chamber such that said water channel extends between said inner and outer chambers; said inlet port being communicated with one of said inner chamber and said outer chamber and, said outlet port being communicated with the other of said inner chamber and said outer chamber; and voltage applying means connected to said inner and said outer electrodes for applying a d.c. voltage between said inner and said outer electrodes, said d.c. voltage causing said raw water to be treated into said purified water in said water channel by utilization of said chlorine ions.

2. An apparatus as claimed in claim 1, wherein said inner and said outer electrodes are concentric with each other.

3. An apparatus as claimed in claim 1, further comprising an outlet pipe connected to said outlet port for delivering said purified water.

4. An apparatus as claimed in claim 1, wherein said elongate water channel extends in a vertical direction and said inlet of the elongate water channel is positioned higher than said outlet of the elongate water channel.

5. An apparatus as claimed in claim 1, further comprising:
voltage adjusting means for adjusting a voltage level of said d.c. voltage;
flow detecting means for detecting a flow rate of at least one of said raw water and said purified water to produce a flow detection signal; and
control means connected to said voltage adjusting means and said flow detecting means for controlling operation of said voltage adjusting means in response to said flow detection signal.

6. An apparatus as claimed in claim 1, further comprising:
voltage adjusting means for switching a voltage level said d.c. voltage;
flow detecting means for detecting presence or absence of a water flow of at least one of said raw water and said purified water; and
control means connected to said voltage adjusting means and said flow detecting means for controlling said voltage adjusting means to apply said d.c. voltage of a low level and a high level in absence of said water flow and in presence of said water flow, respectively.

7. An apparatus as claimed in claim 1, wherein said water tank comprises:
a cup-shaped member having an open end; and
a cap closing said open end, said cap mounting said inner and said outer electrodes and being made with said outlet port.

8. An apparatus as claimed in claim 7, further comprising an inlet port made to said cap for supplying said raw water into said predetermined gap.

9. An apparatus as claimed in claim 7, wherein said cup-shaped member has a bottom opposite to said open end, each of said inner and said outer electrodes being apart from said bottom.

10. An apparatus as claimed in claim 1, further comprising polarity switching means for switching a polarity of said d.c. voltage between said inner and said outer electrodes.

11. An apparatus as claimed in claim 1, further comprising:
a temperature sensor for detecting a temperature of at least one of said raw water and said purified water in said water tank to produce a temperature detection signal;
power adjusting means connected to said voltage applying means for adjusting a power level relating to said d.c. voltage; and
control means connected to said power adjusting means and said temperature sensor for controlling operation of said power adjusting means in response to said temperature detection signal.

12. An apparatus as claimed in claim 1, further comprising power setting means connected to said voltage applying means for setting a plurality of power supply levels in connection with temperature levels of said raw water, said voltage applying means applying said d.c. voltage between said inner and said outer electrodes in accordance with one of said power supply levels.

13. An apparatus as claimed in claim 1, further comprising:
a conductivity sensor for detecting an electrical conductivity of said raw water to produce a conductivity detection signal;
power adjusting means connected to said voltage applying means for adjusting a power level relating to said d.c. voltage; and
control means connected to said power adjusting means and said conductivity sensor for controlling operation of said power adjusting means in response to said conductivity detection signal.

14. An apparatus as claimed in claim 1, further comprising power setting means connected to said voltage applying means for setting a plurality of power supply levels in connection with conductivity levels of said raw water, said voltage applying means applying said d.c. voltage between said inner and said outer electrodes in accordance with one of said power supply levels.

15. An apparatus as claimed in claim 1, wherein said raw water is subjected to electrolysis in said water tank with said d.c. voltage being applied between said inner and said outer electrodes, said electrolysis producing resultant gases from said raw water, said apparatus further comprising gas discharge means for discharging said resultant gases from said water tank.

16. An apparatus as claimed in claim 15, wherein said gas discharge means comprises:
a gas discharge port formed on said water tank; and
a plug removably closing said gas discharge port.

17. An apparatus as claimed in claim 15, wherein said gas discharge means comprises:
a gas discharge pipe communicating with an internal cavity of said water tank; and
a gas discharge valve equipped in said gas discharge pipe.

18. An apparatus as claimed in claim 17, wherein said gas discharge pipe is connected to a top of said water tank.

19. An apparatus as claimed in claim 17, further comprising an outlet pipe connected to said outlet port for delivering said purified water, said discharge pipe being communicated with said outlet pipe.

20. An apparatus as claimed in claim 17, further comprising a water sump opened to air for receiving a liquid flowing out through said gas discharge pipe.

21. An apparatus as claimed in claim 1, further comprising:
timer means for monitoring an energization start time instant of starting application of said d.c. voltage between said inner and said outer electrodes and an energizing period during which said inner and said outer electrodes are energized; and
energization control means connected to said timer means and said voltage applying means for controlling operation of said voltage applying means in accordance with said energization start time instant and said energizing period.

22. An apparatus as claimed in claim 1, further comprising:
- a water supply sensor for detecting supply of said raw water to said water tank to produce a water supply detection signal;
- interval setting means for setting a particular time interval;
- timer means responsive to said water supply detection signal for monitoring the lapse of time from the start of the water supply; and
- energization control means connected to said interval setting means, said timer means, and said voltage applying means for controlling operation of said voltage applying means to apply said d.c. voltage between said inner and said outer electrodes when said particular time interval has lapsed from the start of the water supply.

23. An apparatus as claimed in claim 22, wherein said interval setting means sets, as said particular time interval, one of a plurality of time intervals.

24. An apparatus as claimed in claim 22, further comprising a temperature sensor for detecting the temperature of said raw water supplied to said water tank to produce a temperature detection signal, said interval setting means setting said particular time interval with reference to said temperature detection signal.

25. An apparatus as claimed in claim 22, wherein said energization control means further is connected to said water supply sensor and further controls operation of said voltage applying means to apply said d.c. voltage between said inner and said outer electrodes when said water supply sensor detects the water supply.

26. An apparatus as claimed in claim 24, wherein said energization control means determines a time period of application of said d.c. voltage between said inner and said outer electrodes in response to said temperature detection signal.

27. An apparatus as claimed in claim 24, further comprising resetting means connected to said water supply sensor and said timer means for resetting said timer means in response to occurrence of said water supply detection signal.

* * * * *

UNITED STATES PATENT AND TRADEMARK OFFICE
CERTIFICATE OF CORRECTION

PATENT NO.: 6,126,797

DATED: October 3, 2000

INVENTORS: Motoharu SATO and Kazushige WATANABE

It is certified that errors appear in the above-identified patent and that said Letters Patent is hereby corrected as shown below:

In Claim 25, line 1, delete "22" and insert --24--.

In Claim 27, line 1, delete "24" and insert --22--.

Signed and Sealed this

Seventeenth Day of April, 2001

*Attest:*

NICHOLAS P. GODICI

*Attesting Officer*     *Acting Director of the United States Patent and Trademark Office*